(12) United States Patent
Ishibashi et al.

(10) Patent No.: US 7,292,260 B2
(45) Date of Patent: Nov. 6, 2007

(54) IMAGE FORMING APPARATUS AND IMAGE FORMING METHOD

(75) Inventors: Hideyasu Ishibashi, Kanagawa (JP); Hiroaki Hyuga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 10/947,299

(22) Filed: Sep. 23, 2004

(65) Prior Publication Data

US 2005/0062831 A1 Mar. 24, 2005

(30) Foreign Application Priority Data

Sep. 24, 2003 (JP) ............................. 2003-331821
Sep. 24, 2003 (JP) ............................. 2003-332148
Sep. 24, 2003 (JP) ............................. 2003-332249

(51) Int. Cl.
*B41J 2/47* (2006.01)

(52) U.S. Cl. .................... 347/251; 347/252; 347/254

(58) Field of Classification Search ............... 347/251, 347/252, 254
See application file for complete search history.

(56) References Cited

U.S. PATENT DOCUMENTS

| | | | | |
|---|---|---|---|---|
| 4,368,491 A | * | 1/1983 | Saito ........................... | 358/3.23 |
| 4,698,691 A | * | 10/1987 | Suzuki et al. ................ | 358/3.2 |
| 4,998,257 A | * | 3/1991 | On et al. ..................... | 372/29.02 |
| 5,099,259 A | * | 3/1992 | Hirahara et al. ............. | 347/183 |
| 5,495,341 A | * | 2/1996 | Kawana et al. .............. | 358/3.21 |
| 5,581,343 A | * | 12/1996 | Chowdry et al. ............ | 399/45 |
| 5,617,216 A | * | 4/1997 | Wada ........................... | 358/2.1 |
| 5,792,597 A | * | 8/1998 | Kawai .......................... | 430/363 |

FOREIGN PATENT DOCUMENTS

| | | |
|---|---|---|
| JP | 2000-52592 A | 2/2000 |
| JP | 2000-305191 A | 11/2000 |

* cited by examiner

*Primary Examiner*—Hai Pham
*Assistant Examiner*—Kainoa Wright
(74) *Attorney, Agent, or Firm*—Sughrue Mion, PLLC

(57) ABSTRACT

An image forming apparatus records an image on a photosensitive material by controlling a light emission amount from a plurality of light emission elements that each emit light in accordance with a supplied light emission control signal. The apparatus has a control signal generation unit and a first and second signal generation sections and a signal switching section. The control signal generation unit generates a first light amount control signal from a density modulation. The second signal generation section generates an ON/OFF control signal and a second light amount control signal as a pair of signals from a combination of a density modulation and an area modulation. The signal switching section generates a light emission control signal by performing signal switching between the first light amount control signal and the pair of the signals. The exposure by the light emission is overlaid. The second light amount control signal has short pulses having pulse widths shorter than a time constant of the initial rising stage of the light emission.

18 Claims, 8 Drawing Sheets

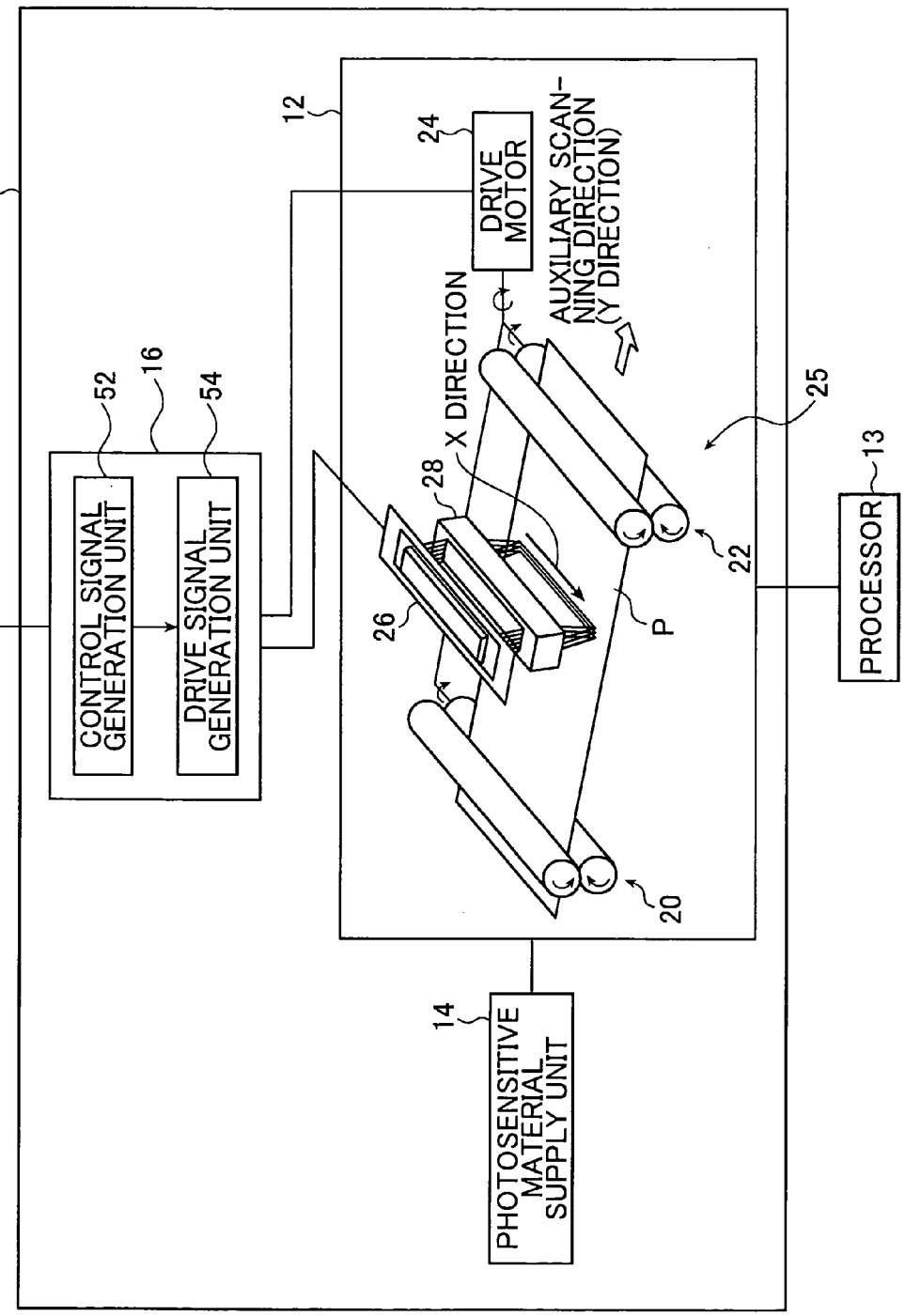

IMAGE FORMING APPARATUS AND IMAGE FORMING METHOD

BACKGROUND OF THE INVENTION

The present invention relates to an image forming apparatus that exposes and records an image by controlling the light emission amount of each light emission element such as an organic electroluminescence element (hereinafter referred to as the "organic EL element") using an image input signal, and an image forming method.

A color print system for printing out an image of a photograph or the like records the image as a latent image by exposing a photosensitive material with modulated light and then prints out the image by processing and developing the latent image.

Nowadays, various techniques are proposed with which in the color print system, organic EL elements are used as a light source for exposing the photosensitive material.

Each organic EL element includes a cathode electrode forming an electron injection electrode, an anode electrode forming a hole injection electrode, and an organic layer that is a thin film arranged so as to be sandwiched between these electrodes and containing a fluorescent organic compound. With this construction, by causing a current (drive current) to flow between these electrodes, electrons are injected into the cathode and holes are injected into the anode. Then, recombination energy is generated through the recombination between the holes and the electrons and the organic layer is excited by this energy. Following this, at the time of transition from an excited state to a ground state, the organic layer emits fluorescence, thereby performing light emission.

The organic EL element having such a construction is influenced by moisture and oxygen around it and there easily occurs a dark spot that is a portion of the light emission region of the organic EL element where no light emission is performed. In view of this problem, a dry process is used for the production of the organic EL element. Also, the organic EL element is produced and constructed using various schemes for excluding the moisture and oxygen, such as the refinement of the organic material in the organic EL element, the adjustment of the vacuum degree at the time of film formation, and the sealing of the organic EL element. At this stage, however, it is extremely difficult to produce the organic EL element so as to have a sufficient light emission characteristic by suppressing the occurrence of the dark spot.

In addition, aside from the occurrence of the dark spot, the organic EL element has other problems such as a brightness degradation problem in that the brightness of the organic EL element is lowered along with the use. Therefore, it is also difficult to realize an apparatus that outputs a high quality image while achieving a long life span.

A printer apparatus using the organic EL element as a light source is proposed in JP 2000-305191 A, although a practical color print system is not yet provided at present.

Also, JP 2000-52592 A discloses a print head, which exposes a photosensitive material using the light of the organic EL element, and a drive method therefor. This print head is made in order to solve the problems such as the dark spot problem that becomes a cause of streak unevenness of a formed image and the life span problem (brightness degradation problem) in that the brightness of the organic EL element is lowered along with the use. This head using the organic EL element forms a color image by overlay-writing three images in the three primary colors on a single photosensitive plane (multiplex-exposure). It is said in this patent document that with this print head, it becomes possible to extremely reduce the influence of the conventional dark spot problem.

By the way, in the case of an exposure recording apparatus that exposes and records an image on a photosensitive material using light emission elements such as a laser light source, a so-called pulse-width modulation system is used. When an image input signal of an image is supplied, the density of the image that should be formed on the photosensitive material is determined from this image input signal. The exposure light amount and the light emission amount of each light emission element are determined so that the density is realized, a pulse control signal is generated in which a pulse width has been controlled so that the light emission amount is realized, and the light emission element performs the exposure and recording.

When the organic EL element described above is used as the light emission element in the exposure recording apparatus having such a construction, from the viewpoint of ease of control, a method is conceived with which an image is exposed and recorded on a photosensitive material using the pulse width modulation system. In this case, the image is recorded by causing the organic EL element to emit light having a light emission amount corresponding to an exposure light amount required by the photosensitive material. Also, in this case, as can be understood from the light emission mechanism described above, the organic EL element is caused to perform the light emission through the control of a drive current, that is, through the linear control of the signal level of the drive current where the light emission amount of the organic EL element has been quantized.

It is conceived, however, that in such control of the light emission amount of the organic EL element, the gradation reproducibility of the image may not become appropriate due to the characteristics of the photosensitive material and extreme differences occur between the levels of density gradation.

It is considered that with the print head disclosed in JP 2000-52592 A, it becomes possible to reduce the influences of noises, such as the dark spot, by forming an image through multiple-exposure. In this print head, however, an image is formed through density modulation with multiple-exposure by organic EL elements different in each pixel position of the image to be recorded, so that there is a problem in that it is not necessarily possible to appropriately reproduce the gradation of an image having continuous gradation levels of half tones. That is, when the multiple-exposure is performed in image formation in the manner described above, this results in a situation where the flexibility of an image forming method is limited, which leads to a problem in that the gradation reproducibility of an image is limited.

SUMMARY OF THE INVENTION

The present invention has been made in order to solve the problems described above and has an object to provide an image forming apparatus that exposes and records an image by controlling the light emission amount of each light emission element, such as an organic EL element using an image input signal, and an image forming method; with the image forming apparatus and the image forming method, it becomes possible to form an image without impairing the gradation reproducibility of the image as compared with a case of conventional image exposure and recording using organic EL elements, in more detail, to smoothly reproduce the density gradation of the image without causing density differences having visually recognizable degrees in the density gradation of the reproduced image and it also becomes possible to form an image with no streak unevenness by preventing the influence of a dark spot of the organic EL element.

The present invention provides an image forming apparatus that exposes and records an image on a photosensitive material by controlling a light emission amount of each light emission element using an image input signal. The apparatus has: a plurality of light emission elements that each emit light in accordance with a supplied light emission control signal; and a control signal generation unit that generates the light emission control signal from the image input signal, wherein the control signal generation unit includes: a first signal generation section that generates a first light amount control signal that controls the light emission amount of each light emission element such that an image is formed on the photosensitive material at a determined density; a second signal generation section that generates an ON/OFF control signal and a second light amount control signal as a pair of signals, the ON/OFF control signal controlling ON/OFF of exposure by the light emission element and the second light amount control signal controlling the light emission amount of the light emission element at the time of the exposure, such that the photosensitive material, in which the recording should be performed, is exposed by the ON/OFF of the exposure; a computation section that determines the light emission amount of light that the light emission element should emit from the image input signal using a light amount-density characteristic of the photosensitive material, thereby determining a light emission amount control level of the first light amount control signal; and a signal switching section that generates the light emission control signal by performing signal switching between the first light amount control signal and the pair of the ON/OFF control signal and the second light amount control signal in accordance with a magnitude of a difference between an image forming density obtained on the photosensitive material at the light emission amount control level of the first light amount control signal and an image forming density obtained at a control level adjacent to the determined control level.

In the apparatus, it is preferable that exposure patterns to be exposed on the photosensitive material by the ON/OFF of the exposure are determined, the patterns having different sizes, and the second signal generation section generates the ON/OFF control signal and the second light amount control signal corresponding to each exposure pattern, and the signal switching section generates the light emission control signal by performing switching of a signal for controlling the light emission element to the ON/OFF control signal and the second light amount control signal corresponding to one exposure pattern selected from among the exposure patterns such that a difference between an image forming density at a light emission amount control level determined from the image input signal and an image forming density at a control level adjacent to the image forming density becomes equal to or less than a predetermined value.

Preferably, the control signal generation unit generates the ON/OFF control signal from the image input signal to which a first noise component has been added.

Preferably, the control signal generation unit further includes a judgment section that makes a judgment by comparing a difference in image forming density between adjacent control levels with an addition value obtained by adding a second noise component to a predetermined certain value, and the switching section generates the light emission control signal by performing the signal switching in accordance with a result of the judgment.

Preferably, control signal generation unit generates, as the second light amount control signal, a pulse that causes the light emission by the light emission element to be started and causes the light emission by the light emission element to be ended within a rising response stage at the time of the light emission, and the light emission amount of the light emission element is controlled in accordance with the pulse.

Then, the control signal generation unit preferably generates a short pulse whose pulse width is equal to or shorter than a time constant of rising at the time of the light emission possessed by the light emission element. Then, the control signal generation unit preferably generates at least two short pulses having different pulse widths as the second light amount control signal, and the light emission element performs the exposure and recording by emitting light a plurality of times with respect to a same image position using the at least two short pulses of the second light amount control signal.

Then, the light emission element is preferably controlled in light emission intensity through control of a pulse width of the short pulse.

When the difference between the image forming density obtained on the photosensitive material at the determined light emission amount control level and the image forming density obtained at the control level adjacent to the determined control level is equal to or more than a predetermined value, the control signal generation unit preferably generates a plurality of short pulses and sets the plurality of short pulses as the second light amount control signal.

In the apparatus, the light emission element may be an electroluminescence element.

Then, it is preferable that a plurality of light emission element arrays are formed by arranging a plurality of electroluminescence elements in a line manner and a light emission head is formed by arranging the plurality of light emission element arrays in parallel in a direction orthogonal to an arrangement direction of the electroluminescence elements, the image forming apparatus further comprises a moving unit that moves the photosensitive material, on which the image is to be recorded, in a direction orthogonal to the arrangement direction relative to the light emission head, and in order to record the image through density modulation and area modulation in a predetermined pattern of dots, the light emission head records the image by exposing, using the second light amount control signal and the ON/OFF control signal, the moving photosensitive material in the arrangement direction in a line manner while overlay-exposing a portion of the photosensitive material exposed by an electroluminescence element using other electroluminescence element.

Then, it is preferable that the control signal generation unit generates the second light amount control signal using higher-order bits of the image input signal and generates the ON/OFF control signal using lower-order bits thereof such that intervals between adjacent levels of gradation by the density modulation are sub-divided by levels of gradation by the area modulation in the image recorded on the photosensitive material.

Preferably, as the pattern, a plurality of patterns different in size of dots that should be recorded by the electroluminescence element are determined for one level of gradation by the area modulation, and the control signal generation unit generates the ON/OFF control signal while performing switching between the plurality of patterns.

In the plurality of light emission element arrays, the electroluminescence elements are preferably arranged at predetermined intervals, and the light emission head includes at least one light emission element array where the electroluminescence elements are arranged so as to be displaced from the organic electroluminescence elements in at least one other light emission element array in the arrangement direction.

Then, the control signal generation unit preferably performs interpolation processing on the image input signal in accordance with an electroluminescence element displacement amount and generates a light emission control signal that controls light emission in the at least one light emission element array, in which the electroluminescence elements are arranged so as to be displaced, from the image input signal subjected to the interpolation processing.

The control signal generation unit preferably performs a plurality of kinds of interpolation processing with respect to the image input signal and generates the light emission control signal to be supplied to the at least one light emission element array, in which the electroluminescence elements are arranged so as to be displaced, while performing switching between the plurality of kinds of interpolation processing in accordance with which portion of the image is to be recorded.

The control signal generation unit preferably performs a plurality of kinds of interpolation processing with respect to the image input signal and generates the light emission control signal to be supplied to the light emission element array, in which the electroluminescence elements are arranged so as to be displaced, while performing averaging processing on interpolation processing results.

The present invention also provides an image forming apparatus that exposes and records an image by controlling a light emission amount of each light emission element using an image input signal. The apparatus has: a plurality of light emission elements that each emit light in accordance with a light emission control signal; and a control signal generation unit that generates, in accordance with the image input signal, a pulse, which causes the light emission by each light emission element to be started and causes the light emission by the light emission element to be ended within a rising response stage at the time of the light emission, as the light emission control signal, wherein the light emission amount of the light emission element is controlled in accordance with the light emission control signal.

In the apparatus, the control signal generation unit preferably generates a short pulse whose pulse width is equal to or shorter than a time constant of the rising response stage at the time of the light emission possessed by the light emission element as the light emission control signal.

Then, preferably, the control signal generation unit generates at least two short pulses having different pulse widths as the light emission control signal, and the light emission element performs the exposure and recording by emitting light a plurality of times with respect to an image position using the light emission control signal.

The light emission element is preferably controlled in light emission intensity through control of a pulse width of the pulse.

The light emission element may be an electroluminescence element.

In the apparatus, it is preferable taht a plurality of light emission element arrays are formed by arranging a plurality of electroluminescence elements in a line manner and a light emission head is formed by arranging the plurality of light emission element arrays in parallel in a direction orthogonal to an arrangement direction of the electroluminescence elements, the image forming apparatus further comprises a moving unit that moves the photosensitive material, on which the image is to be recorded, in a direction orthogonal to the arrangement direction relative to the light emission head, in order to record the image through density modulation and area modulation, the control signal generation unit generates, from the image input signal, a light amount control signal that controls an exposure light amount of each electroluminescence element and an ON/OFF control signal that controls light emission by the electroluminescence element in accordance with each position of the image that should be recorded such that the exposure is performed in a predetermined pattern of dots, and the light emission head records the image by exposing, using the light amount control signal and the ON/OFF control signal, the moving photosensitive material in the arrangement direction in a line manner while overlay-exposing a portion of the photosensitive material exposed by an electroluminescence element using other electroluminescence element.

Then, preferably the control signal generation unit generates the light amount control signal using higher-order bits of the image input signal and generates the ON/OFF control signal using lower-order bits thereof such that intervals between adjacent levels of gradation by the density modulation are sub-divided by levels of gradation by the area modulation in the image recorded on the photosensitive material.

Preferably, as the pattern, a plurality of patterns of dots that should be recorded by the electroluminescence element are determined for one level of gradation by the area modulation, and the control signal generation unit generates the ON/OFF control signal while performing switching between the plurality of patterns.

In the plurality of light emission element arrays, the electroluminescence elements are preferably arranged at predetermined intervals, and the light emission head includes at least one light emission element array where the organic electroluminescence elements are preferably arranged so as to be displaced in the arrangement direction from the electroluminescence elements in at least one other light emission element array.

More preferably, the control signal generation unit performs interpolation processing on the image input signal in accordance with an electroluminescence element displacement amount and generates a light emission control signal to be supplied to the light emission element array, in which the electroluminescence elements are arranged so as to be displaced, from the image input signal subjected to the interpolation processing.

More preferably, the control signal generation unit performs a plurality of kinds of interpolation processing with respect to the image input signal and generates the light emission control signal to be supplied to the light emission element array, in which the electroluminescence elements are arranged so as to be displaced, while performing switching between the plurality of kinds of interpolation processing in accordance with which portion of the image is to be recorded.

More preferably, the control signal generation unit performs a plurality of kinds of interpolation processing with respect to the image input signal and generates the light emission control signal to be supplied to the light emission element array, in which the electroluminescence elements are arranged so as to be displaced, while performing averaging processing on interpolation processing results.

The present invention also provides an image forming apparatus that exposes and records an image on a photosensitive material by controlling a light emission amount of each light emission element using an image input signal. The apparatus has: a light emission head in which a plurality of light emission element arrays formed by arranging a plurality of organic electroluminescence elements in a line manner are provided in parallel in a direction orthogonal to an arrangement direction of the plurality of organic electroluminescence elements; a moving unit that moves the photosensitive material, on which the image is to be recorded, in the direction orthogonal to the arrangement direction relative to the light emission head; and a control signal generation unit that generates, in order to record the image through density modulation and area modulation, from the image input signal, a light amount control signal that controls an exposure light amount of each organic electroluminescence element and an ON/OFF control signal that controls light emission by the organic electroluminescence element in accordance with positions of the image that should be recorded such that the exposure is performed in a predetermined pattern of dots, wherein the light emission head records the image by exposing, using the light amount control signal and the ON/OFF control signal, the moving photosensitive material in the arrangement direction in a line manner while overlay-exposing a portion of the photosensitive material exposed by an organic electroluminescence element with other organic electroluminescence element.

In the apparatus, preferably the control signal generation unit generates the light amount control signal using higher-order bits of the image input signal and generates the ON/OFF control signal using lower-order bits thereof such that intervals between adjacent levels of gradation by the density modulation are sub-divided by levels of gradation by the area modulation in the image recorded on the photosensitive material.

Preferably, as the pattern, a plurality of patterns of dots that should be recorded by the organic electroluminescence element are determined for one level of gradation by the area modulation, and the control signal generation unit generates the ON/OFF control signal while performing switching between the plurality of patterns. In the plurality of light emission element arrays, the organic electroluminescence elements are preferably arranged at predetermined intervals, and the light emission head preferably includes at least one light emission element array where the organic electroluminescence elements are arranged so as to be displaced array in the arrangement direction from the organic electroluminescence elements in at least one other light emission element.

The control signal generation unit preferably performs interpolation processing on the image input signal in accordance with an organic electroluminescence element displacement amount and generates a light emission control signal to be supplied to the light emission element array, in which the organic electroluminescence elements are arranged so as to be displaced, from the image input signal subjected to the interpolation processing.

The control signal generation unit preferably performs a plurality of kinds of interpolation processing with respect to the image input signal and generates the control signal to be supplied to the light emission element array, in which the organic electroluminescence elements are arranged so as to be displaced, while performing switching between the plurality of kinds of interpolation processing in accordance with which portion of the image is to be recorded.

The control signal generation unit preferably performs a plurality of kinds of interpolation processing with respect to the image input signal and generates the light emission control signal to be supplied to the light emission element array, in which the organic electroluminescence elements are arranged so as to be displaced, while performing averaging processing on interpolation processing results.

The present invention also provide an image forming method of exposing and recording an image on a photosensitive material by controlling a light emission amount of each light emission element using an image input signal. The method has: a first signal generation step of generating from the image input signal a first light amount control signal that controls the light emission amount of each light emission element such that an image is formed on the photosensitive material at a determined density; a second signal generation step of generating from the image input signal an ON/OFF control signal that controls ON/OFF of exposure by the light emission element and a second light amount control signal that controls the light emission amount by the light emission element for the exposure as a pair of signals such that each part of the photosensitive material, in which the recording should be performed, is exposed by the ON/OFF of the exposure; and a control signal generating step of determining the light emission amount of light that the light emission element should emit from the image input signal using a light amount-density characteristic of the photosensitive material, and generating the light emission control signal by performing signal switching between the first light amount control signal generated in the first signal generation step and the pair of the ON/OFF control signal and the second light amount control signal generated in the second signal generation step in accordance with a magnitude of a difference between an image forming density obtained on the photosensitive material at a light emission amount control level of the first light amount control signal determined by the light emission amount and an image forming density obtained at a control level adjacent to the light emission amount control level.

The present invention also provides an image forming method of exposing and recording an image by controlling a light emission amount of each light emission element using a light emission control signal generated from an image input signal. The method has a step of generating, as the light emission control signal, a short pulse that causes light emission by the light emission element to be started and causes the light emission by the light emission element to be ended within a rising response stage at the time of the light emission; and a step of performing the exposure and recording by driving the light emission element using the light emission control signal.

In the method, a short pulse having a pulse width that is equal to or shorter than a time constant of rising at the time of the light emission possessed by the light emission element is preferably generated as the light emission control signal. Then, a signal including at least two short pulses having different pulse widths is generated as the light emission control signal, and the light emission element performs the exposure and recording by emitting light a plurality of times with respect to an image position using the light emission control signal.

It is preferable that the image is exposed and recorded on the photosensitive material by the light emission element, the light emission amount of light that should be emitted by the light emission element is determined from the image input signal using a light amount-density characteristic of the photosensitive material, and when a difference between an image forming density at a light emission amount control level of the light emission amount and an image forming density at a control level adjacent to the light emission amount control level is equal to or more than a predetermined value, the light emission control signal is generated by generating a plurality of short pulses.

The present invention also provides an image forming method of using a light emission head, in which a plurality of light emission element arrays formed by arranging a plurality of organic electroluminescence elements in a line manner are provided in parallel in a direction orthogonal to an arrangement direction of the plurality of organic electroluminescence elements, and forms an image on a photosensitive material that moves relative to the light emission head. The image forming method has a step of generating, in order to record the image through density modulation and area modulation, from an image input signal, a light amount control signal that controls an exposure light amount of each organic electroluminescence element and an ON/OFF control signal that controls light emission by the organic electroluminescence element in accordance with positions of the image that should be recorded such that the exposure is performed in a predetermined pattern of dots; and a step of forming the image through the density modulation and the area modulation by exposing the moving photosensitive material in the arrangement direction using the light amount control signal and the ON/OFF control signal, with first exposure being performed using an organic electroluminescence element and second exposure being further performed by overlay-exposing a portion exposed by the first exposure using other organic electroluminescence element.

It is preferable that in the plurality of light emission element arrays, the organic electroluminescence elements are arranged at predetermined intervals, the light emission head includes at least one light emission element array where the organic electroluminescence elements are arranged so as to be displaced array in the arrangement direction from the organic electroluminescence elements in at least one other light emission element, and the image input signal is subjected to interpolation processing in accordance with an organic electroluminescence element displacement amount and a light emission control signal to be supplied to the at least one light emission element array, in which the organic electroluminescence elements are arranged so as to be displaced, is generated from the image input signal subjected to the interpolation processing.

According to the present invention, the control signal generation unit determines the light emission amount of light to be emitted by the light emission element from the image input signal using the light amount-density characteristic of the photosensitive material. The unit generates the light emission control signal by performing the switching between the first light amount control signal and a pair of signals which are the ON/OFF control signal and the second light amount control signal for controlling the light emission element. The switching is performed in accordance with the magnitude of the difference between the image forming density to be formed on the photosensitive material at the light emission amount control digital level given by the first light amount control signal and the image forming density to be formed at a digital level adjacent to the control digital level. As a result, it becomes possible to finely set the density gradation so that no density difference can be recognized visually between the control level of the first light amount control signal and the control level adjacent thereto, which makes it possible to reproduce the density gradation of the image smoothly.

Also, according to the present invention, when the ON/OFF control signal is generated in accordance with the image input signal, pulses are generated as the ON/OFF control signals each of which causes the light emission to be started and causes the light emission to be ended within the initial rising response stage at the time of the light emission, so that it becomes possible to finely control the light emission amount. As a result, it becomes possible to suppress differences between the levels of the density gradation in the image to a visually unrecognizable degree as compared with a case where a pulse width is set with a control level of 12 bits, 14 bits, or the like and single exposure is performed by the set pulse, which makes it possible to reproduce the density gradation of the image smoothly.

Further, according to the present invention, the image is recorded by multiple-exposing the moving photosensitive material with the light emission head using the organic EL elements, with this recorded image being formed through the density modulation and the area modulation, both modulation of which are performed by using the second light amount control signal and the ON/OFF control signal. As a result, as compared with a case of conventional image exposure and recording using organic EL elements, it becomes possible to form the image without impairing the gradation reproducibility of the image. Also, it becomes possible to form the image so as to have no streak unevenness by preventing the influence of a dark spot of the organic EL element. Further, it becomes possible to suppress noise components contained when the image input signal is quantized as a digital signal. In addition, the image formation is performed while performing the switching between the dot patterns used at the time of the area modulation, so that it becomes possible to prevent troubles that the textures of the patterns are visually recognized.

This application claims priority on Japanese patent applications No. 2003-331821, No. 2003-332148 and No. 2003-332249, the entire contents of which are hereby incorporated by reference. In addition, the entire contents of literatures cited in this specification are incorporated by reference.

BRIEF DESCRIPTION OF THE DRAWINGS

In the accompanying drawings:

FIG. 1 is a construction diagram of a color printer as an example of the image forming apparatus according to the present invention that forms an image by exposing a photosensitive material;

DETAILED DESCRIPTION OF THE PREFERRED EMBODIMENTS

Figure 2A:
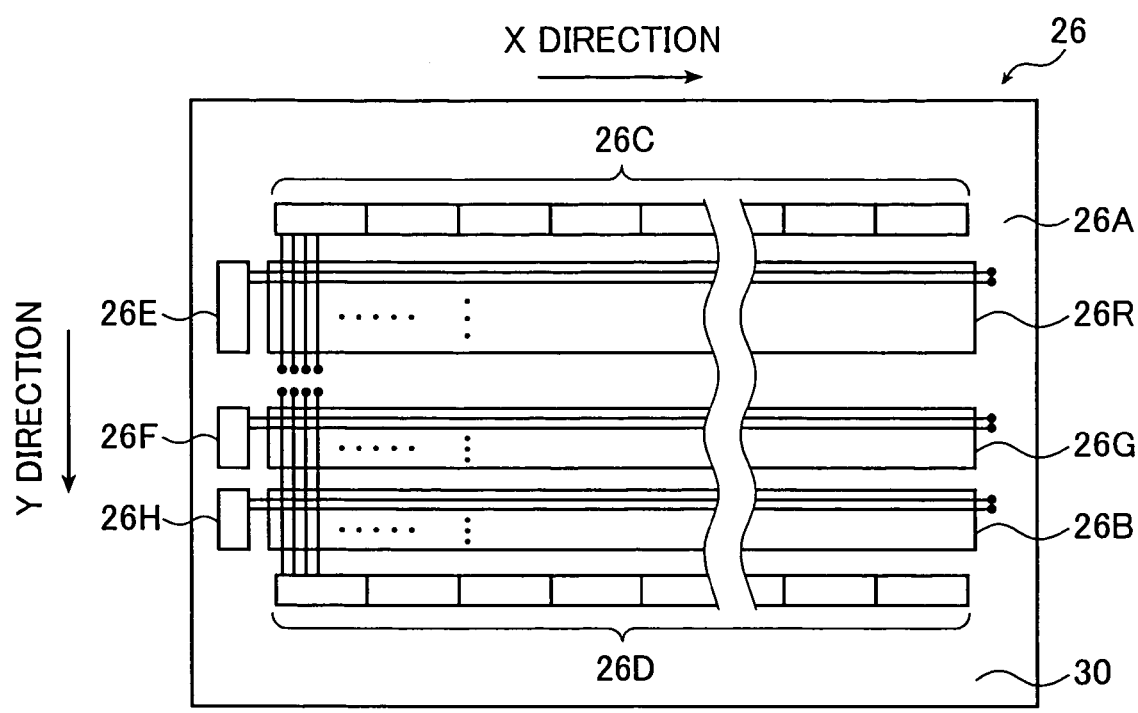
FIGS. 2A to 2C are each a construction diagram showing a head construction of a light emission head in the color print head shown in FIG. 1.

The image forming apparatus and the image forming method according to the present invention will now be described in detail based on preferred embodiments illustrated in the accompanying drawings.

FIG. 1 is a construction diagram of a color printer 10 as an example of the image forming apparatus according to the present invention that forms an image by exposing a photosensitive material.

The printer 10 includes a head unit 12 that exposes and records a latent image on a photosensitive material P using a supplied image input signal, a photosensitive material supply unit 14 that transports and supplies the photosensitive material P to the head unit 12, and a signal processing unit 16 that generates a drive signal for driving the head unit 12 in order to expose and record an image on the photosensitive material P.

The signal processing unit 16 in the printer 10 is connected to an image processing apparatus 18 so that a post-image-processing signal subjected to image processing in the image processing apparatus 18 is supplied to the signal processing unit 16 as the image input signal. Also, a transport path of the photosensitive material P in the head unit 12 is connected to a processor 13 so that the photosensitive material P exposed and recorded in the head unit 12 is guided to the processor 13.

The head unit 12 forms an image on the photosensitive material P by scanning and exposing the photosensitive material P in a line manner in a direction (main scanning direction, X direction) orthogonal to a transport direction (auxiliary scanning direction, Y direction) of the photosensitive material P. The photosensitive material P is transported at a constant speed. The head unit 12 includes roller pairs 20 and 22 that transport the photosensitive material P in the auxiliary scanning direction (Y direction) at the constant speed and a moving unit 25 having a drive motor 24. The respective drive roller pairs 20 and 22 are mechanically connected to the drive motor 24. In the construction, the drive force of the drive motor 24 is transmitted to the drive rollers.

The head unit 12 also includes a light emission head 26 that exposes the photosensitive material P by irradiating light thereonto and a lens array 28 composed of a SELFOC lens that effects image formation using the light from the light emission head 26 at predetermined positions of the photosensitive material P.

It should be noted here that in the present invention, the moving unit 25 is a unit that moves the photosensitive material P while the light emission head 26 is fixed, although another unit construction may also be employed instead in which the photosensitive material P is set stationary and the light emission head 26 is moved.

Also, the light emission head 26 has a head length equal to or longer than the sheet width of the photosensitive material P. In the present invention, however, the head length may be set shorter than the sheet width of the photosensitive material P. In this case, the moving unit 25 may be constructed so as to move the photosensitive material P or the light emission head 26 in the main scanning direction in synchronization with the timings of scanning and exposure so that exposure and recording are performed across the sheet width of the photosensitive material P. In the exposure and recording in the main scanning direction, multiple-exposure to be described later may be performed.

The light emission head 26 is a head where multiple light emission element array lines are provided in parallel in a direction orthogonal to the arrangement direction of the organic EL elements, each line formed by arranging multiple organic electroluminescence elements (organic EL elements) in a line shape, and the head 26 records an image on the photosensitive material P through scanning and exposure by controlling the light emission of each organic EL element. More specifically, constructions shown in FIGS. 2A to 2C are used.

Figure 2B:
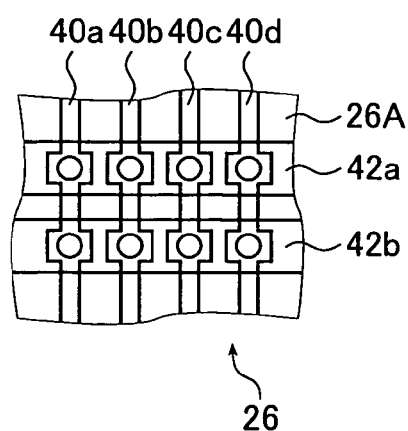
Figure 2C:
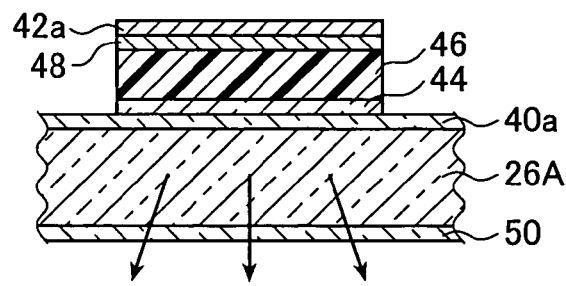

As shown in FIG. 2A, the light emission head 26 includes R light emission array 26R for emitting R (red) light formed by arranging, in parallel and in the Y direction (auxiliary scanning direction), a G light emission array 26G for emitting G (green) light formed by arranging, in parallel and in the Y direction and a B light emission array 26B for emitting B (blue) light formed by arranging, in parallel and in the Y direction.

The R light emission array 26R has 32 organic EL array lines, each line formed by arranging 3520 organic EL elements on a glass substrate 26A having transparency in the X direction (main scanning direction). The G light emission array 26G has 16 organic EL array lines, each line formed by arranging 3520 organic EL elements in the X direction. The G light emission array 26G has 16 organic EL array lines, each line formed by arranging 3520 organic EL elements in the X direction. Driving ICs 26C, 26D, 26E, 26F, and 26H for causing a current to flow in order to cause light emission by controlling these arrays.

The driving IC 26C is an anode driving IC for injecting holes into each organic EL element of the R light emission array 26R and the driving IC 26E is a cathode driving IC for injecting electrons into each organic EL element of the R light emission array 26R. The driving IC 26D is an anode driving IC for injecting holes into each organic EL element of the G light emission array 26G and the B light emission array 26B. Also, the driving IC 26F is a cathode driving IC for injecting electrons into each organic EL element of the G light emission array 26G and the driving IC 26H is a cathode driving IC for injecting electrons into each organic EL element of the B light emission array 26B. These ICs are connected to anode electrodes and cathode electrodes through wiring.

As described above, each organic EL element includes a cathode electrode forming an electron injection electrode, an anode electrode forming a hole injection electrode, and an organic layer that is a thin film arranged so as to be sandwiched between these electrodes and containing a fluorescent organic compound. In FIG. 2B, eight organic EL elements provided for the glass substrate 26A are illustrated. In each organic EL element, the organic layer that is a thin film containing a fluorescent organic compound is formed at an overhead crossing point between its anode electrode 40a, 40b, 40c, or 40d and its cathode electrode 42a or 42b, and light emission is performed in the intersection portion. FIG. 2C is a schematic cross-sectional view of the organic EL element and schematically illustrates the organic EL element provided at the intersection position between the anode electrode 40a and the cathode electrode 42a.

As shown in FIG. 2C, in the organic EL element, the anode electrode 40a made of indium tin oxide (ITO) or the like and having transparency is formed on the glass substrate 26A having transparency, a hole transport layer 44 made of TPD (N',N'-diphenyl-N,N'-bis(3-metyl-phenyl)(1,1'-biphenyl)-4'4-diamine) is formed on the anode electrode 40a, and an organic layer 46 forming a light emission layer, in which a very small quantity of alumiquinoline ($Alq_3$), quinacridone, a coloring matter for laser, or the like is doped as a light emission material (dopant), is formed on the hole transport layer 44. Further, an electron transport layer 48 is formed on the organic layer 46 and the cathode electrode 42a is formed on the electron transport layer 48. The materials for these layers are not specifically limited and known materials may be used. For instance, it is possible to use the materials described in JP 2000-305191 A, the application of which was filed by the assignee of the present invention.

Also, on the lower surface of the glass substrate 26A in FIG. 2C (surface thereof on a side opposite to the surface provided with the layers described above), a color filter 50 of red, green, or blue is formed in a region corresponding to one of the R light emission array 26R, the G light emission array 26G, and the B light emission array 26B. With this construction, light emitted by the organic layer 46 that is a light emission layer passes through the hole transport layer 44, the anode electrode 40a, and further the glass substrate 26A, and light having a wavelength corresponding to the color of the color filter 50 is emitted from the lower side of the glass substrate 26A in FIG. 2C.

Light emitted from the R light emission array 26R, the G light emission array 26G, and the B light emission array 26B having such a construction is imaged by the lens array 28 at predetermined positions of the photosensitive material P and forms dots of light. As a result, an image of one dot is exposed and recorded on the photosensitive material P by light emitted from one organic EL element.

Figure 3:
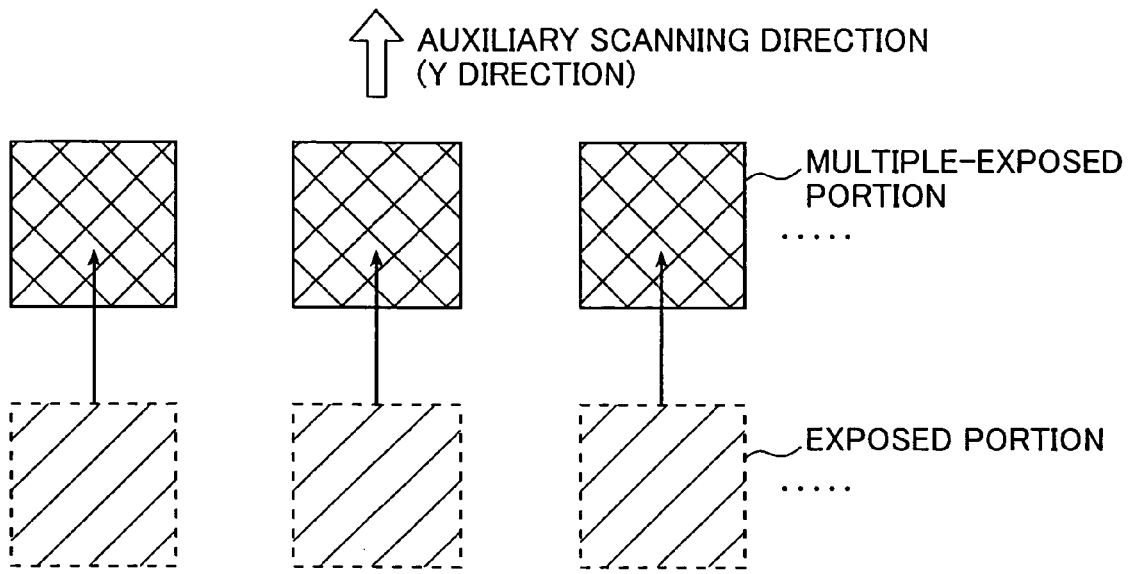
FIG. 3 is an explanatory diagram illustrating an example of exposure performed with the image forming method according to the present invention.

In the present invention, images of dots are recorded in a line manner in the main scanning direction (X direction) through scanning and exposure of such dot images. In addition, the exposed dots are multiple-exposed using the multiple organic EL array lines arranged in the auxiliary scanning direction (Y direction) in parallel. That is, as shown in FIG. 3, when an exposed portion exposed by one organic EL array line passes through an imaging position of light from another organic EL array line arranged in the Y direction, overlay-exposure is performed (multiple-exposure is performed).

The reason why the multiple-exposure is performed in this manner is that it is required to prevent as much as possible a situation where streak unevenness locally occurs in a formed image due to differences in exposure light amount between the respective organic EL elements resulting from the occurrence and advancement of dark spots of the organic EL elements, and moreover, differences in light amount ascribable to differences in brightness degradation between the organic EL elements, and the like. That is, it is required to multiplex-expose one region using multiple organic EL elements in order to reduce the influence of streak unevenness due to differences in exposure light amount between the organic EL elements as much as possible.

Also, a drive signal is generated in the signal generation unit 16 so that the gradation of an image formed through the multiple-exposure is expressed by density modulation and area modulation. The density modulation means a system where density gradation is created by changing the density of a recorded image by changing an exposure light amount at the time of exposure by one organic EL element. On the other hand, the area modulation is a system where the density gradation is adjusted by changing area of dots for exposure ON by controlling the ON/OFF of exposure for dots in accordance with a predetermined exposure pattern while setting the exposure light amount at the time of one exposure with one organic EL element constant. This modulation system will be described later.

Referring again to FIG. 1, the photosensitive material supply unit 14 is a section that pulls out a web of the photosensitive material P wound in a roll form by a predetermined length, cuts it into a cut sheet, and supplies the cut sheet of the photosensitive material P to the head unit 12.

The processor 13 is a known apparatus that visualizes an image by performing development processing on the photosensitive material P on which the image has been recorded as a latent image. In the processor 13, development processing, fixation processing, rinse processing, and the like are performed.

The signal processing unit 16 includes a control signal generation unit 52 that generates, from the image input signal supplied from the image processing apparatus 18, a light amount control signal (first light amount control signal $V_1$ and second light amount control signal $V_3$) that controls the exposure light amount of each organic EL element and an ON/OFF control signal $V_2$ that controls the ON/OFF of exposure by the organic EL element using a predetermined exposure pattern in accordance with the positions of the dots of an image that is going to be recorded, and a drive signal generation unit 54 that generates a drive signal that drives the light emission head 26 from the generated control signals. That is, the control signal generation unit 52 is a unit that generates a light emission control signal for controlling the light emission by the organic EL element from the image input signal supplied from the image processing apparatus 18.

Figure 4:
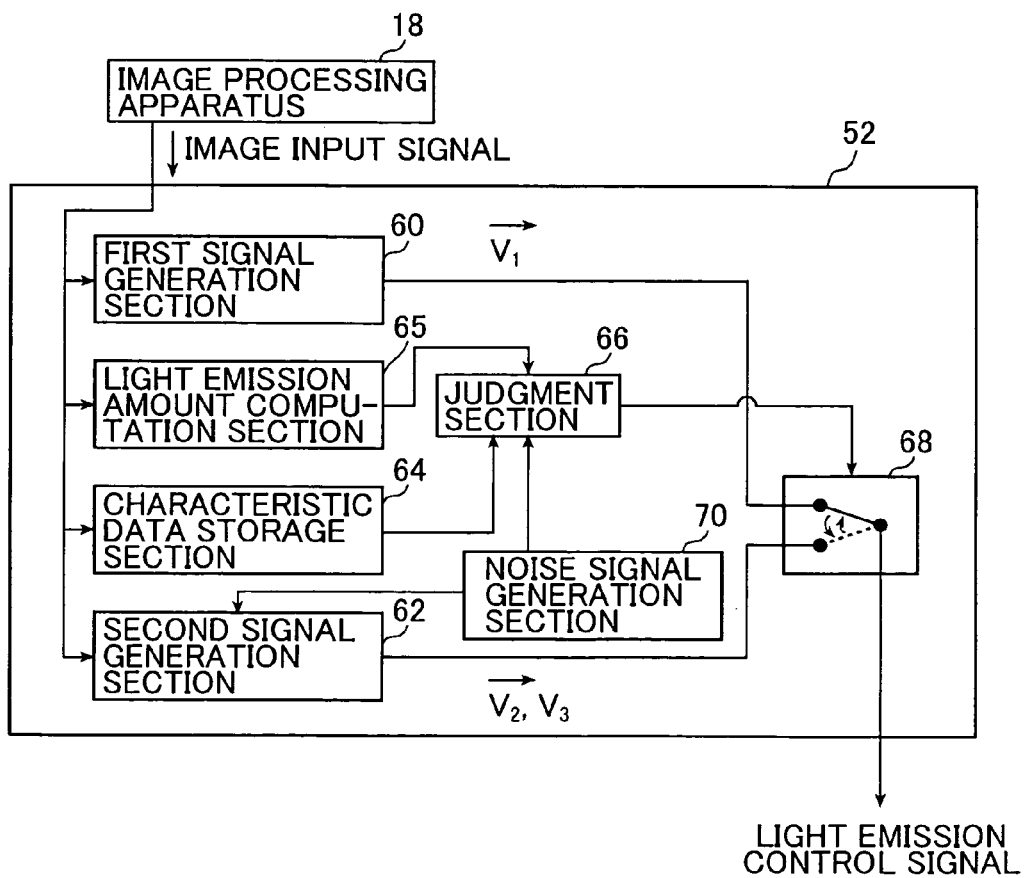
FIG. 4 is a block diagram of a control signal generation unit that is the main section of the color printer shown in FIG. 1.

FIG. 4 is a block diagram showing a schematic construction of the control signal generation unit 52.

As shown in this drawing, the control signal generation unit 52 includes a first signal generation section 60, a second signal generation section 62, a characteristic data storage section 64, a light emission amount computation section 65, a judgment section 66, a switching section 68, and a noise signal generation section 70.

The first signal generation section 60 is a section that generates, for each pixel of an image, the first light amount control signal $V_1$ that controls the light emission amount of the organic EL element so that the image is formed on the photosensitive material P at a predetermined density, stores the generated first light amount control signal $V_1$, reads the first light amount control signal $V_1$ corresponding to a portion in which exposure and recording are to be performed with the organic EL element, and supplies the first light amount control signal $V_1$ to the switching section 68. In the first signal generation section 60, a recording density is determined from the image input signal by referring to a predetermined reference table, the light emission amount of light that the organic EL element should emit is determined using the light amount-density characteristic of the photosensitive material P so that the determined density is realized, and a light emission amount control level characterizing the first light amount control signal $V_1$ is determined from the light emission amount. The light emission amount control level means a pulse width level of the divided levels of the pulse width such as 4096 levels of 12 bits (Levels 0 to 4095) or the like in order to perform exposure while controlling the pulse light emission by the organic EL element based on a light emission duration time. For instance, when the exposure light amount of the photosensitive material P needs to be increased, the light emission amount control level is raised by increasing the pulse width, thereby increasing the light emission amount of the organic EL element. In this manner, a pulse signal at a determined level is generated as the first light amount control signal $V_1$. Accordingly, the first light amount control signal $V_1$ is a signal that controls exposure in a so-called density modulation system where the density of an image is based on the density of each dot of the exposed and recorded image by the light emission amount of the organic EL element.

The second signal generation section 62 is a section that generates, for each pixel of an image, the ON/OFF control signal $V_2$ that controls the ON/OFF of exposure by the organic EL element and the second light amount control signal $V_3$ that controls the light emission amount of the organic EL element at the time of the exposure, thereby performing the exposure in a predetermined exposure pattern by switching between the ON/OFF of the exposure in accordance with each dot of the image to be formed on the photosensitive material P. The section 62 stores the ON/OFF control signal $V_2$ and the second light amount control signal $V_3$, sequentially reads the ON/OFF control signal $V_2$ and second light amount control signal $V_3$ in accordance with a portion to be exposed and recorded by the organic EL element, and supplies the signals to the switching section 68.

The ON/OFF control signal $V_2$ is a signal that defines the ON/OFF of exposure for each dot of the image in accordance with an exposure pattern determined from the image input signal. The pattern is arranged by dots of the ON/OFF of exposure. The second light amount control signal $V_3$ is a signal that controls the light emission amount of the organic EL element so that the dot image is formed on the photosensitive material P at a predetermined density when exposure is performed in accordance with the exposure pattern. Here, the second light amount control signal $V_3$ is generated from the higher-order bits of the image input signal that is a digital signal and the ON/OFF control signal $V_2$ is generated from the lower-order bits thereof. That is, with the ON/OFF control signal $V_2$ and the second light amount control signal $V_3$, the ON/OFF of light emission is controlled in accordance with the exposure pattern and the light emission amount at the time of the light emission is also controlled. Then, the gradation of an image is finely reproduced by the ON/OFF of the dot image using the exposure pattern so that the levels of gradation determined by the density of the dot image formed through control of the light emission amount are interpolated. With this construction, exposure using the so-called density modulation system and the area modulation system in combination is performed by which the density of an image to be recorded is finely reproduced in accordance with an exposure pattern while roughly controlling the light emission amount of the organic EL element. In this case, in the area modulation system as shown in FIG. 3, each portion exposed with one organic EL array line is overlay-exposed when passing through the imaging position of light from another organic EL array line arranged in the Y direction.

Also, in the second signal generation section 62, a noise signal supplied from the noise signal component section 70 is added to the lower-order bits of the image input signal, thereby generating the ON/OFF control signal $V_2$. The noise signal component section 70 is a section that generates a noise component having a predetermined size and supplies it to the second signal generation section 62 and the switching section 68.

When a 12-bit second light amount control signal $V_3$ and a 4-bit ON/OFF control signal $V_2$ (4×4 exposure pattern) are to be generated from a 14-bit image input signal, for instance, signal information needs to have a size of 16 bits (=12+4) that is an excessive quantum number with respect to the size of the image input signal which is 14 bits. Therefore, the noise component is added to the lower-order bits (15th and 16th bits) other than the 1st to 14th bits. In this manner, at the time of generation of the ON/OFF control signal $V_2$, the noise component is added, thereby determining the exposure pattern. Accordingly, even from the same image input signal, the type of the exposure pattern to be determined changes depending on the noise component, so the exposure pattern of dot images recorded using the ON/OFF control signal $V_2$ does not always become the same pattern. Consequently, there will not occur periodical changing of the density ascribable to the exposure pattern.

The characteristic data storage section 64 stores the light amount-density characteristic of the photosensitive material P that should be recorded where the correspondence between the light emission amounts of light to be irradiated and the image forming densities obtained with the light emission amounts has been determined, and also stores a density characteristic where the correspondence between the control levels of the organic EL element and the image forming densities to be obtained at the control levels has been determined. These density characteristics are read into the light emission amount computation section 65 and the judgment section 66 as necessary.

The light emission amount computation section 65 is a section that determines the light amount of light to be emitted from the supplied image input signal and informs the judgment section 66 of the determined light amount. Specifically, the light emission amount computation section 65 reads the light amount-density characteristic of the photosensitive material P from the characteristic data storage section 64, determines the light emission amount of light to be emitted by each organic EL element using the read characteristic, and informs the judgment section 66 of the determined light emission amount.

The judgment section 66 is a section that determines a control level to be given by the light emission amount control signal $V_1$ using the light emission amount informed from the light emission amount computation section 65 and makes a judgment by comparing a difference between an image forming density at a control level and an image forming density at its adjacent control level with a predetermined threshold value. The image forming density at the control level is determined using the density characteristic read from the characteristic data storage section. Here, the threshold value is an addition value obtained by adding the noise component to a predetermined value each time for the comparing. Accordingly, the threshold value varies each time the comparison is made.

Assuming that the light emission amount control signal $V_1$ is expressed with 12 bits, for instance, the control level is expressed by Levels 0 to 4095 and the difference in image forming density between the adjacent levels is compared with the threshold value.

Figure 5A:
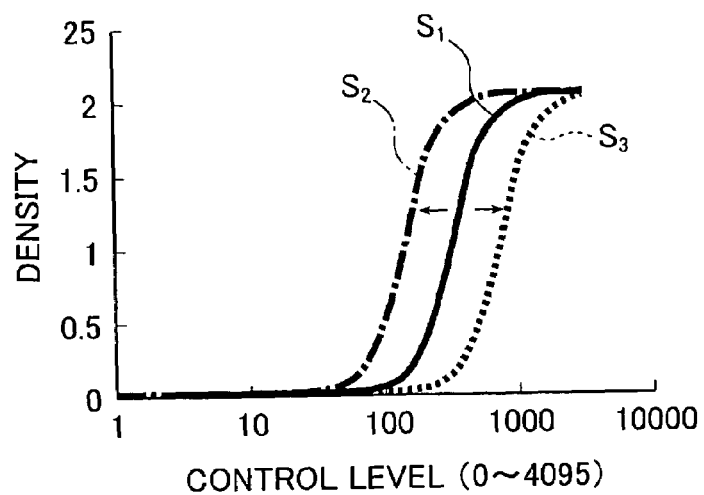
FIG. 5A is a graph of examples of a density characteristic expressing a relation between a light emission amount control digital level for an organic EL element and an image forming density obtained on a photosensitive material at this control digital level.
Figure 5B:
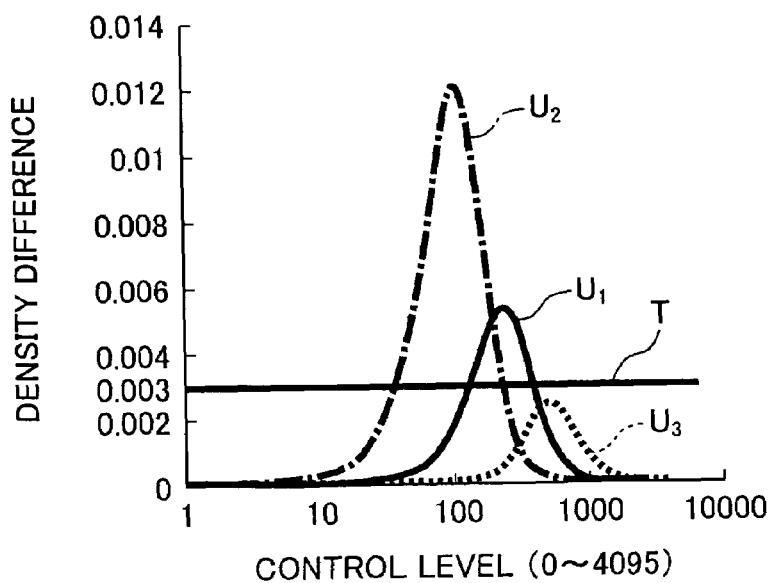
FIG. 5B shows differences in image forming density between adjacent control digital levels in the three density characteristics.

FIG. 5A is a graph of examples of the density characteristic expressing the relation between control levels and densities formed on the photosensitive material P at the control levels when control is performed with the 12-bit light emission amount control signal $V_1$ (Levels 0 to 4095). In FIG. 5A, a curved line $S_1$ expresses a standard density characteristic of the photosensitive material P and curved lines $S_2$ and $S_3$ each express the density characteristic when the sensitivity changes due to the temperature, humidity, degradation with the passage of time, and the like. FIG. 5B shows the distribution of density differences in image forming density between adjacent control levels as to the three types of density characteristic. In FIG. 5B, a straight line T is a straight line expressing 0.003 of a density difference. This density difference (0.003) is a limit value as to whether it is possible for humans to visually recognize the density differences, and means that when this limit value is exceeded, humans are capable of visually recognizing the density difference. Accordingly, when the density characteristic changes from the curve $S_1$ to the curve $S_2$, as is apparent from the relation between the straight line T and a curved line $U_2$ (see FIG. 5B) expressing density differences corresponding to the curved line $S_2$, the density differences are visually recognized in a density range of 0 to 1.5. Accordingly, when the density characteristic of the photosensitive material P having a standard density characteristic has changed due to an environmental variation or the like, this results in a situation where the levels of gradation of an image reproduced on the photosensitive material P are not smoothly connected.

Therefore, the judgment section 66 judges each portion, whether the levels of gradation of an image to be reproduced on the photosensitive material P will be smoothly connected or not, with reference to the difference in image forming density between adjacent control levels. When doing so, an addition value obtained by adding the noise component supplied from the noise signal generation section 70 to a predetermined value is applied to the comparison and judgment as a threshold value. The reason why a result of the addition of the noise component to the predetermined value is used as the threshold value in the comparison and judgment in this manner is that when a fixed threshold value is used and the switching from the first light amount control signal $V_1$ to a pair of the ON/OFF control signal $V_2$ and the second light amount control signal $V_3$ is performed based on the fixed threshold value in the switching section 68 to be described later, there is a case where the levels of gradation of the image are not necessarily smoothly connected in each portion in which the signal switching has been performed. Note that the limit value as to the density differences that humans are capable of visually recognizing is 0.003, so that a value that is 0.002 is used as the predetermined value.

In this manner, a difference in image forming density between a control level and its adjacent control level is compared with the threshold value obtained by adding the noise component to the predetermined value, thereby making a judgment whether the difference is greater than the threshold value. Information showing a result of this judgment is supplied to the switching section 68.

The switching section 68 is a section that, in accordance with the supplied information showing the judgment result, performs signal switching between the first light emission amount control signal $V_1$ and the pair of the ON/OFF control signal $V_2$ and the second light emission amount control signal $V_3$, thereby generating a light emission control signal.

That is, in accordance with the judgment result information supplied from the judgment section 66, the pair of the ON/OFF control signal $V_2$ and the second light emission amount control signal $V_3$ or the first light emission amount control signal $V_1$ is selected. For instance, the switching section 68 performs the signal switching so that the pair of the ON/OFF control signal $V_2$ and the second light emission amount control signal $V_3$ are selected when the difference in image forming density is greater than the threshold value and the first light emission amount control signal $V_1$ is selected in other cases. In this manner, a light emission control signal is generated by the selected signal and is supplied to the drive signal generation unit 54.

The reason why the signal switching is performed in the switching section 68 in this manner is that when image recording is performed in the density modulation system using the first light emission amount control signal $V_1$, there occurs a case where a density difference between adjacent control levels may have a degree with which humans are capable of visually recognizing the difference and the levels of density gradation cannot be smoothly connected. Therefore, when there is a high possibility that the levels of density gradation will not be smoothly connected, the signal switching from the first light emission amount control signal $V_1$ to the pair of the ON/OFF control signal $V_2$ and the second light emission amount control signal $V_3$ is performed, thereby performing the exposure and recording of an image using a combination of the density modulation system and the area modulation system.

Generally, when the density difference exceeds the limit value that is 0.003, it becomes possible for humans to visually recognize the density difference. Accordingly, by setting the predetermined value at 0.002 that is slightly lower than the limit value and using a result of addition of a noise component to the predetermined value as the threshold value, it becomes possible to perform the signal switching on a random basis within a certain range.

The light emission control signal generated in this manner is supplied to the drive signal generation unit 54.

It should be noted here that when the signal switching to the pair of the ON/OFF control signal $V_2$ and the second light emission amount control signal $V_3$ is performed and the exposure and recording of an image is performed using the density modulation and the area modulation, the following processing is performed.

Assuming that the image input signal supplied from the image processing apparatus 18 is a digital signal of 12 bits, for instance, the control signal generation unit 52 generates the second light emission amount control signal $V_3$ using the eight higher-order bits of this signal and generates the ON/OFF control signal $V_2$ using the four lower-order bits thereof. The density gradation of a dot image exposed by one organic EL element with the second light emission control signal $V_3$ is set so as to have 256 levels and the density gradation expressed by a dot pattern formed by the ON/OFF control signal $V_2$ is set so that each level of the aforementioned 256-level gradation is subdivided into 16 levels.

That is, the ON/OFF control signal $V_2$ and the second light emission amount control signal $V_3$ are generated in the control signal generation unit 52 so that the levels of gradation by the density modulation is interpolated by the levels of gradation by the area modulation in an image recorded on the photosensitive material P.

Figures 6A, 6B:
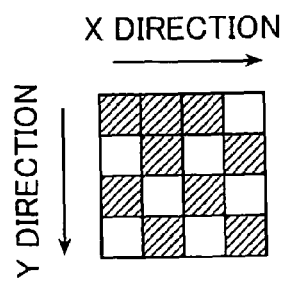
FIGS. 6A and 6B show examples of the characteristics of an image recorded with the image forming method according to the present invention.

The ON/OFF control signal $V_2$ generated from the lower-order bits is a signal that reproduces gradation with the selected pattern through area modulation in order to express one level of the density gradation using 4×4 pixels as shown in FIG. 6A, for instance. The density gradation by the area modulation shown in the example of FIG. 6A is at Level 8 among Levels 0 to 15. FIG. 6B shows an example of a threshold value matrix for setting a dot exposure pattern (dither pattern) in such a case of 4×4 pixels. When the ON/OFF control signal $V_2$ has a value of 8, the organic EL elements are caused to emit light so that dots are formed at pixels in shaded portions shown in FIG. 6A corresponding to portions in which threshold values in the threshold value matrix shown in FIG. 6B is equal to or less than 8.

In addition, the ON/OFF control signal $V_2$ is generated so that the position of each dot in the main scanning direction of the exposure pattern described above is moved to a different position in the main scanning direction each time exposure is performed. In the case of the dot pattern shown in FIG. 6A where the gradation is at Level 8, for instance, three dots are formed so as to be arranged side by side on the left side on the uppermost pixel row. In another exposure at Level 8, however, the three dots are not always formed so as to be arranged side by side on the left side in succession on the uppermost pixel row. So long as the three dots are arranged on the uppermost pixel row, the arrangement positions of the dots in the main scanning direction are freely set. For instance, the dot arrangement positions are set on a random basis.

As described above, even at the same level of density gradation in the area modulation, by forming an image while freely changing the exposure pattern each time exposure in the main scanning direction is performed, it becomes possible to reduce a large difference between the levels of the density gradation resulting from the rough gradation in the density modulation.

Each control signal generated in this manner is supplied to the drive signal generation unit 54.

The drive signal generation unit 54 converts the supplied pulse control signal into a drive signal for driving the light emission head 26. The light emission head 26 is driven by this drive signal so that predetermined positions of the photosensitive material P are exposed in synchronization with the timings of movement of the photosensitive material P by the transport roller pairs 20 and 22.

In this embodiment, the ON/OFF control signal $V_2$ has been described as a signal composed of pulses having a constant pulse width. As will be described below, however, the ON/OFF control signal $V_2$ may be set as a signal that is composed of short pulses having different pulse widths and causes the light emission by the organic EL element to be started and causes the light emission by the organic EL element to be ended within an initial rising response stage at the time of the light emission.

That is, the light emission head 26 is caused to start the light emission by the organic EL element and to end the light emission by the organic EL element at the rising response stage of the light emission. The organic EL element has characteristics indicated by a characteristic curve shown in FIG. 7 where the light emission intensity at the time of light emission is increased with time and the rising response time is relatively long as compared with a case of laser elements. When a time constant in this characteristic (time at an intersection of a tangential line L at the time of rising and a light amount level P under a steady state in FIG. 7) is referred to as $\tau$, this time constant $\tau$ becomes several micro seconds in some cases. Consequently, in the present invention, a construction is employed in which each organic EL element is driven so that the light emission is turned OFF within this rising response stage and light emission is performed multiple times with respect to the same image position in exposure and recording.

Figure 7:
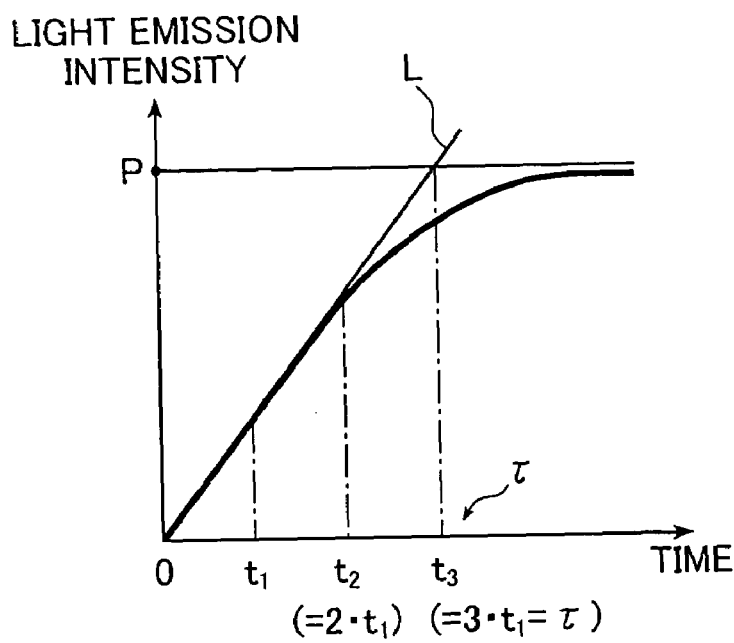
FIG. 7 shows an initial rising response at the time of light emission in the organic EL element.

In this manner, by utilizing the characteristics of the organic EL element that its light emission intensity increases with time at the initial rising response stage, it becomes possible to finely control the light emission amount (integral of the light emission intensity expressed by the characteristic curve along a light emission duration time axis in FIG. 7). More specifically, in the signal processing unit 16 to be described later, a time shown in FIG. 7 obtained by dividing the time constant $\tau$ by three is set as a unit resolution and a pulse control signal is generated which causes the organic EL element to perform light emission for a light emission duration time $t_1$ ($=\tau/3$), a light emission duration time $t_2$ ($=2/3\cdot\tau$), or a light emission duration time $t_3$ ($=\tau$).

Figure 8:
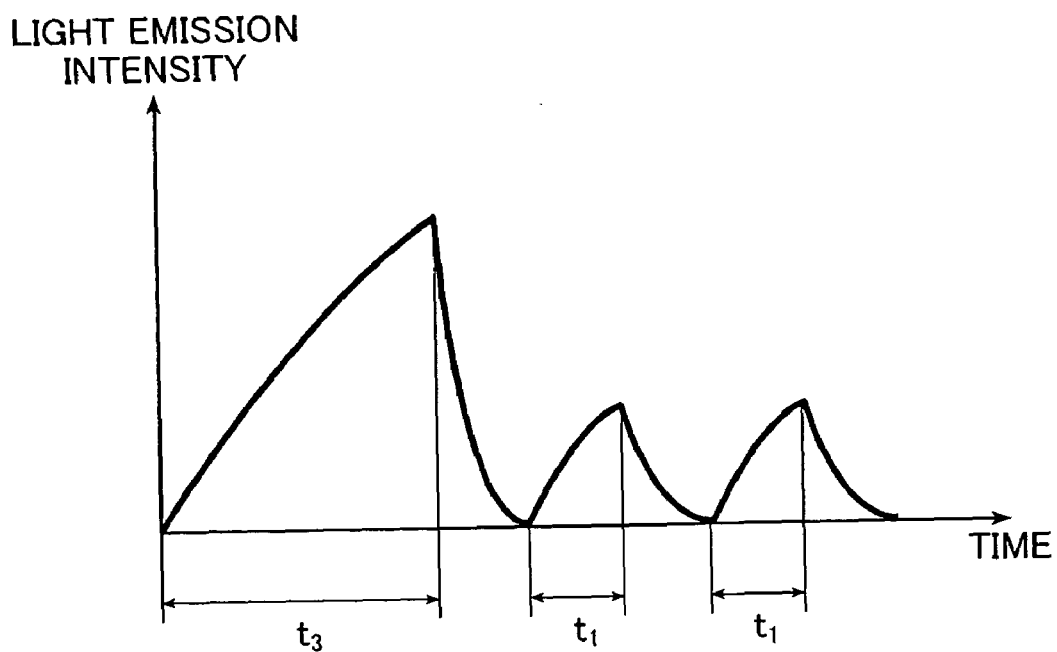
FIG. 8 is an explanatory diagram of the light emission of the organic EL element in the color printer shown in FIG. 1.

FIG. 8 shows an example of such light emission by the organic EL element. In this example, the organic EL element performs light emission three times for the light emission duration times $t_3$, $t_1$, and $t_1$ and a dot is exposed and recorded at the same image position. In each light emission, the organic EL element is controlled so that the light emission duration times $t_3$, $t_1$, and $t_1$ become equal to or less than the time constant $\tau$. These light emission duration times $t_3$, $t_1$, and $t_1$ are set in the second signal generation section 62 in advance. In FIG. 8, exposure and recording are performed by performing light emission three times, although the present invention is not limited to three times and the light emission may be performed once, four times, five times, or the like.

Also, in the above description, a time obtained by dividing the time constant $\tau$ by three is used as the unit resolution that determines the light emission duration time, although in the present invention, the unit resolution is not specifically limited and may be set as a time obtained by dividing the time constant $\tau$ by two, four, five, or the like. Also, there occurs no problem even if the time constant $\tau$ is not divided equally. That is, there occurs not problem so long as the pulse width is set so that the light emission duration time becomes equal to or less than the time constant $\tau$.

As described above, the control signal generation unit 52 may generate the ON/OFF control signal $V_2$ having pulses (short pulses) by determining each light emission duration time so that the organic EL element emits light within a time equal to or shorter than the time constant $\tau$.

Even when such an ON/OFF control signal $V_2$ having short pulses is used as the light emission control signal, in the judgment section 66, first, the light emission amount of the organic EL element corresponding to the image input signal is obtained in advance using the light amount-density characteristic of the photosensitive material P which is obtained by supplying a drive current controlled by a control signal of 12 bits or the like. Next, a quantized control level for controlling the drive current is determined from this light emission amount. Then, it is judged whether a difference in image forming density on the photosensitive material P between this control level and its adjacent control levels has a visually recognizable degree on the image. If it is judged that the difference has the visually recognizable degree, the ON/OFF control signal $V_2$ having the short pulses is selected together with the second light emission amount control signal $V_3$ as the light emission control signal. On the other hand, if it is not judged that the difference has the visually recognizable degree, the first light emission amount control signal $V_1$ composed of pulses having a pulse width corresponding to a determined control level is selected as the light emission control signal. The light emission by the first light emission amount control signal $V_1$ is not light emission by the short pulses described above. Accordingly, the pulse widths of the pulses generated in this case may become longer than the time constant $\tau$.

The reason why the light emission duration times are determined so as to be equal to or shorter than the time constant $\tau$ in the organic EL element and a light emission control signal having short pulses, whose pulse widths are set at the light emission duration times, is generated in this manner is that by finely controlling the light emission of the organic EL element, the density gradation of an image exposed and recorded on the photosensitive material P is set more smooth through control of the light emission amount. That is, when the organic EL element is controlled by a drive current that is a quantized light emission control signal of 12 bits, 14 bits, or the like, there is a case where differences between quantized control levels and their adjacent levels of density gradation of an image formed on the photosensitive material P may have a visually recognizable degree.

As described above, the straight line T in FIG. 5B is a straight line expressing 0.003 of the density difference. This density difference is a threshold value for judging whether it is possible for humans to visually recognize density differences and is a value obtained through a sensory evaluation experiment. When a density difference becomes equal to or more than this threshold value, this means that it is possible for humans to visually recognize the difference. Accordingly, when the density characteristic changes from the curved line $S_1$ to the curved line $S_2$, as is apparent from the relation between the curved line $U_2$ expressing the density differences in the case of the curved line $S_2$ and the straight line T (see FIG. 5B), the density differences are visually recognized in the density range of 0 to 1.5. Accordingly, when the photosensitive material P having a standard density characteristic changes in density characteristic due to an environmental variation or the like, this results in a situation where the levels of gradation of an image reproduced on the photosensitive material P are not smoothly connected visually.

In the present invention, however, as described above, when the density difference becomes 0.003 or more, short pulses having pulse widths that are equal to or shorter than the time constant $\tau$ of the organic EL element are generated as a pulse control signal and light emission is performed once or multiple times in accordance with the pulse control signal, thereby performing exposure and recording at control levels that are finer than the control levels of 12 bits or the like determined from the image input signal. As a result, the gradation of the image reproduced on the photosensitive material P becomes smoother.

Figure 9:
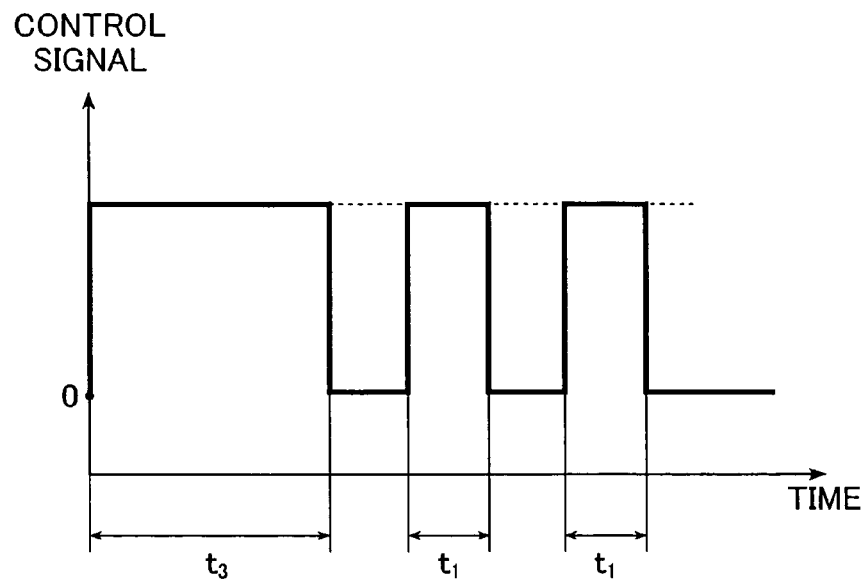
FIG. 9 shows an example of a pulse control signal generated when the light emission shown in FIG. 8 is performed.

FIG. 9 shows the ON/OFF control signal $V_2$ generated in order to perform the light emission shown in FIG. 8 with the organic EL element. In FIG. 9, the pulse widths of short pulses are determined at $t_3$, $t_1$, and $t_1$ so as to correspond to the light emission duration times $t_3$, $t_1$, and $t_1$ shown in FIG. 8. As can be seen from FIGS. 8 and 9, the organic EL element is controlled so as to end the light emission withtin the rising response stage. Consequently, it becomes possible to control the light emission intensity of the light emission by the organic EL element through the control of the pulse widths of the short pulses.

In the example shown in FIG. 9, the pulse heights of the short pulses are set at the same pulse height (the second light emission amount control signal $V_3$ is set constant), although in the present invention, it is not necessarily required to set the pulses so as to have the same pulse height. For instance, the pulse heights may be reduced as the pulse widths are shortened.

The pulse control signal generated in this manner is supplied to the drive signal generation unit 54 through the switching section 68.

Figure 10:
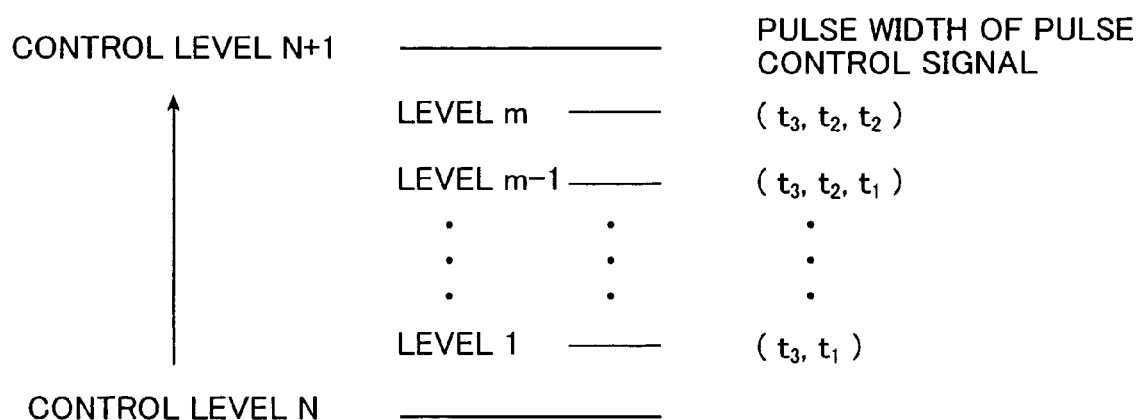
FIG. 10 is an explanatory diagram illustrating control levels created in the image forming apparatus according to the present invention.

FIG. 10 shows minute control levels created by the short pulses between light emission amount control levels N and N+1. These minute control levels are defined by the pulse widths of the short pulses and the number of pulses thereof. In FIG. 10, the minute control levels from Level 1 to Level m (m is a natural number greater than one) are defined. For instance, Level 1 is a control level determined by two short pulses that are a short pulse having a pulse width $t_3$ and a short pulse having a pulse width $t_1$. Each of these control levels is a level where the pulse widths and the number of pulses are set so that the density difference between adjacent control levels reproduced on the photosensitive material P becomes less than the threshold value (density difference at 0.003 plus noise component, for instance). The pulse widths and the number of pulses of the short pulses for such minute control levels are set as a reference table in advance and the minute control levels between the control level N and the control level N+1 are automatically set in accordance with density differences on the photosensitive material P. In this case, the minute levels are determined so that it becomes impossible for humans to visually recognize the density gradation differences. In this manner, a pulse control signal having the short pulses corresponding to the minute control levels is generated.

Figure 11:
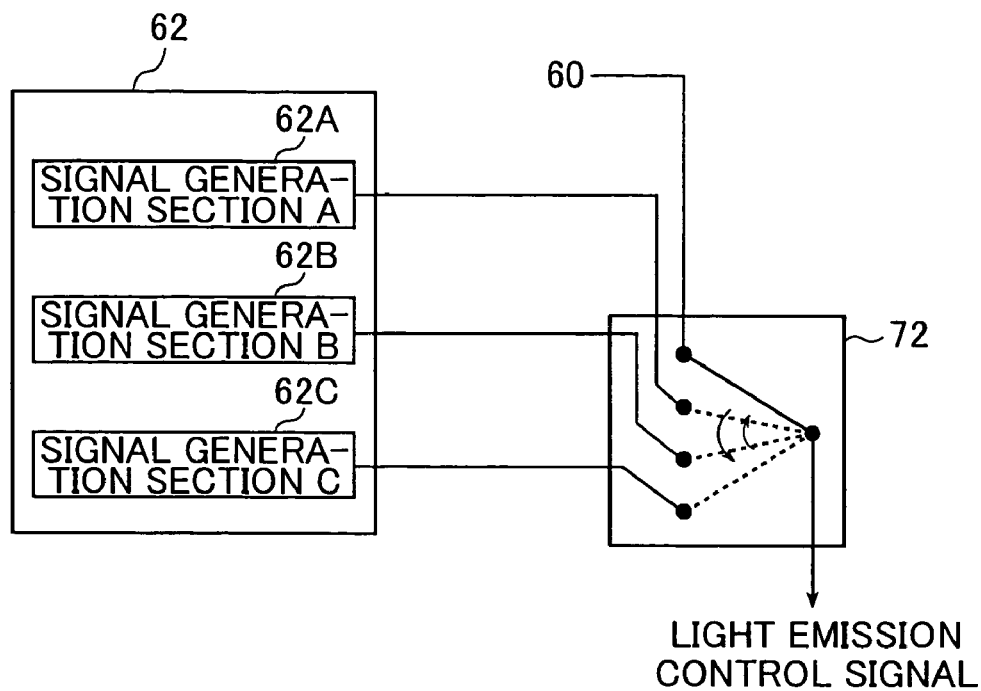
FIG. 11 is a block diagram in another example of the control signal generation unit that is the main section of the color printer shown in FIG. 1.

Here, the second signal generation section 62 in the signal processing unit 16 may have a construction shown in FIG. 11. In this drawing, the second signal generation section 62 includes a signal generation section A (62A), a signal generation section B (62B), and a signal generation section C (62C) that respectively generate different ON/OFF control signals $V_2$ and different light emission amount control signals $V_3$ using exposure patterns having different sizes. For instance, the signal generation section A (62A) uses an exposure pattern of 2×2 dot images, the signal generation section B (62B) uses a 3×3 exposure pattern, and the signal generation section C (62C) uses a 4×4 exposure pattern. Then, the multiple ON/OFF control signals $V_2$ and the multiple light emission amount control signals $V_3$ are supplied to a switching section 72, which then makes a signal selection and performs switching in accordance with a result of the judgment in the judgment section 66.

In this case, as a method of making a selection from among the multiple different ON/OFF control signals $V_2$ and the multiple different light emission amount control signals $V_3$, for instance, when a difference in image forming density between a control level and its adjacent control level is referred to as $\Delta D$, a judgment is made through a comparison with the threshold value described above using $\Delta D/(2\times2)^{(1/2)}$ as to the signal generated using the 2 by 2 dots exposure pattern, a judgment is made through a comparison with the threshold value described above using $\Delta D/(3\times3)^{(1/2)}$ as to the signal generated using the 3 by 3 dots exposure pattern, and a judgment is made through a comparison with the threshold value described above using $\Delta D/(4\times4)^{(1/2)}$ as to the signal generated using the 4 by 4 dots exposure pattern. It is sufficient that these comparisons and judgments are made in the ascending order of the sizes of the exposure patterns and switching is performed so that a signal that falls below the threshold value first is selected. In this example, the comparisons and judgments are made in the order of $\Delta D/(2\times 2)^{(1/2)}$, $\Delta D/(3\times 3)^{(1/2)}$, and $\Delta D/(4\times 4)^{(1/2)}$. Also, as to the generation of the different ON/OFF control signals $V_2$, aside from the generation through changing of the size of the exposure pattern that determines the exposure ON/OFF of dot images, an ON/OFF control signal $V_2$ that determines the ON/OFF of exposure may be generated through application of an error diffusion method using filters having different sizes of Froid type, Jariv type, or the like.

In the color printer 10 having such a construction, first, the density characteristic shown in FIG. 5A is stored in a memory or the like of the characteristic data storage section 65. Such a density characteristic is identified by the kind of the photosensitive material P, so that the density characteristic may be stored for each kind of photosensitive material P and the stored density characteristic of the photosensitive material P may be read in accordance with the kind of the photosensitive material P used for exposure and recording. Also, prior to recording onto the photosensitive material P, in the color printer 10, a drive current may be given in advance to the light emission head 26 using a light emission control signal quantized to 12 bits, 14 bits, or the like and having different pulse widths, the organic EL element may be caused to emit light at respective control levels given by the light emission control signal, and image forming densities formed on the photosensitive material P may be measured using a known densitometer or the like, thereby obtaining the density characteristic of the photosensitive material P. In this case, the density characteristic of the photosensitive material P obtained immediately before exposure and recording is used, so that it becomes possible to finely control the light emission of the organic EL element in accordance with a change of the density characteristic due to an environmental variation or the like.

In the control signal generation unit 52, when the image input signal is supplied from the image processing apparatus 18, the first light emission amount control signal $V_1$, the ON/OFF control signal $V_2$, and the second light emission amount control signal $V_3$ are generated in the first signal generation section 60 and the second signal generation section 62 from this image input signal. Then, these signals are stored in not-shown memories possessed by the first signal generation section 60 and the second signal generation section 62. Note that the ON/OFF control signal $V_2$ and the second light emission amount control signal $V_3$ are generated using the image input signal added with the noise component supplied from the noise signal generation section 70.

On the other hand, in the light emission amount computation section 65, the light emission amount of light that should be emitted by the organic EL element is determined from the image input signal with reference to the light amount-density characteristic of the photosensitive material P and this light emission amount is supplied to the judgment section 66.

In the switching section 68, first, a control level at the time of control with the first light emission amount control signal $V_1$ is determined using the supplied light emission amount. Next, a difference between an image forming density obtained at this control level and an image forming density obtained at its adjacent control level is compared with a determined threshold value (threshold value obtained by adding the noise component to 0.003 of the density difference, for instance). When the difference exceeds the threshold value, the pair of the ON/OFF control signal $V_2$ and the second light emission amount control signal $V_3$ are selected.

On the other hand, when the difference is equal to or less than the threshold value, the first light emission amount control signal $V_1$ is selected. As described above, a construction may be used in which the ON/OFF control signal $V_2$ has short pulses where light emission duration times have been determined so that the organic EL element performs light emission for times that are equal to or shorter than the time constant $\tau$. In this case, the organic EL element is caused to emit light by the short pulses, so that there occurs no density difference having a visually recognizable degree between adjacent levels of density gradation in an image reproduced on the photosensitive material P and it becomes possible to reproduce an image so as to have smoother density gradation and finer density differences as compared with a case of control levels given by the aforementioned control signal of 12 bits, 14 bits, or the like.

In this manner, in the switching section 68, the signal selection is made. Then, the light emission control signal is generated from the selected signal.

The generated light emission control signal is supplied to the drive signal generation unit 54, in which this light emission control signal is converted into a drive signal for the organic EL element that realizes control by the light emission control signal. Then, the drive signal is supplied to the light emission head 26.

In the light emission head 26, the light emission of the organic EL element is controlled by this drive signal and exposure by the density modulation system or exposure by the density modulation system and the area modulation system is performed. Needless to say, such a light emission control signal is supplied to each organic EL element arranged in one direction and scanning and recording is performed in the main scanning direction (X direction). Also, the photosensitive material P is transported in the auxiliary scanning direction (Y direction), so that an image is two-dimensionally recorded by continuously performing exposure and recording through multiple-exposure by the light emission head 26.

The photosensitive material P, on which the image has been recorded in this manner, is supplied to the processor 13 and is developed therein.

It should be noted here that as described above, in the multiple-exposure, an image is formed by the density modulation and the area modulation through the scanning and exposure of the moving photosensitive material P in the main scanning direction (X direction) in a line manner. When doing so, after the photosensitive material is exposed in the line manner with one light emission element array line among the multiple light emission element array lines, each exposed portion is further overlay-exposed by another light emission element array line.

The reason why as to one image input signal, gradation is roughly set with the first light emission amount control signal $V_1$ and is more finely set between respective set gradation levels through the area modulation in the multiplex-exposure in this manner is that the organic EL element is controlled with a control method described below.

The control of the exposure light amount of the organic EL element is linearly performed with respect to the light amount of light to be emitted by the organic EL element, so that the intervals between gradation levels becomes large in a low light amount range on a logarithmic light amount (log E) basis. Therefore, when the photosensitive material P changes in exposure light amount-density characteristic as shown in FIG. 5 due to degradation or an environmental variation, there occurs a case where skipping of density occurs between the levels of gradation in the low light amount range (range in which the image density is low) and the levels of gradation are not smoothly connected and the continuity of gradation is impaired.

Therefore, in the present invention, the gradation is set through the area modulation so that the intervals of gradation roughly set by the density modulation are sub-divided, thereby making it possible to maintain the continuity of gradation.

In addition, the setting of gradation by the area modulation so that the intervals of gradation roughly set by the density modulation are interpolated also suppresses noise components due to quantization errors occurring when the image input signal is quantized as a digital signal.

Figure 12:
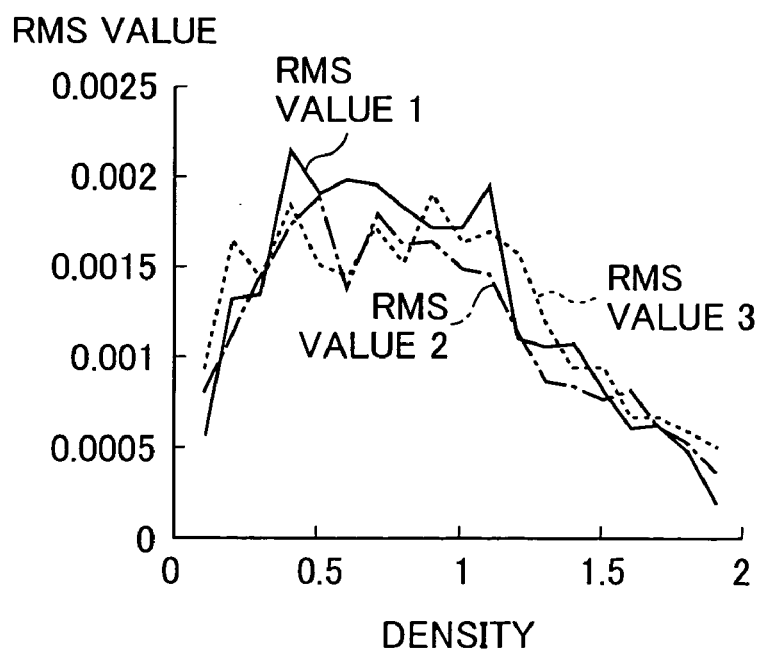
FIG. 12 shows an example of the characteristics of an image recorded with the image forming method according to the present invention.

FIG. 12 is a graph showing noise components in an exposed and recorded image. In this drawing, data of RMS value 1, RMS value 2, and RMS value 3 is illustrated.

The RMS value 1 is data of the noise components (RMS (root means square)) of an image formed with the organic EL element by shortening the image input signal of 14 bits into 12 bits and using the first light amount control signal $V_1$ (4096-step gradation) generated through 12-bit density modulation (image formed through density modulation).

The RMS value 2 is data of the noise components of an image formed with the organic EL element by dividing the 14-bit image input signal into a 12-bit second light amount control signal $V_3$ (4096-step gradation) and a 2-bit ON/OFF control signal $V_2$ (4-step gradation) (image formed through density modulation and dither 2×2).

The RMS value 3 is data of the noise components of an image formed using the organic EL element by cutting the 14-bit image input signal into 12 bits and dividing the 12-bit image input signal into an 8-bit second light amount control signal $V_3$ (256-step gradation) and a 4-bit ON/OFF control signal $V_2$ (16-step gradation) (image formed through density modulation and dither 4×4).

According to FIG. 12, in the case of the RMS value 3, like in the case of the RMS value 2, the noise components are reduced in a density range of 0.4 to 1.0 as compared with the case of the RMS value 1. In particular, the RMS value 3 is reduced in noise component in this density range of 0.4 to 1.0 by around 10% as compared with the case of the RMS value 1.

In addition, it has also been confirmed that when an image is formed through division into the 8-bit second light amount control signal $V_3$ (256-step gradation) and the 4-bit ON/OFF control signal $V_2$ (16-step gradation), it becomes possible to prevent a texture accompanying the area modulation from being visually recognized.

As described above, in the present invention, in accordance with a difference in image forming density between adjacent control levels, the light emission control signal is generated by performing signal switching between the first light amount control signal $V_1$ for forming an image with the density modulation system and the pair of the ON/OFF control signal $V_2$ and the second light amount control signal $V_3$ for forming an image by finely determining the gradation of the image through the concurrent use of the density modulation system and the area modulation system. As a result, the density differences between the levels of gradation of an image formed on the photosensitive material P are reduced to a degree at which the differences are not visually recognized. As a result, the gradation of the image is smoothly reproduced.

Also, it can be understood that by forming an image through combination of the density modulation and the area modulation, the continuity of density gradation and the suppression of noise components are achieved. Needless to say, an image is recorded by multiple-exposure as described above, so that it becomes possible to reduce the fluctuations of exposure light amounts due to dark spots and variations in life span and it also becomes possible to suppress the occurrence of streak unevenness of a formed image.

In the control signal generation unit 52, the first light amount control signal $V_1$ for each pixel of an image is generated in advance in the first signal generation section 60 and is stored in a memory thereof. Also, the ON/OFF control signal $V_2$ and the second light amount control signal $V_3$ for each image pixel are generated in advance in the second signal generation section 62 and is stored in a memory thereof. However, another construction may be employed in which each time a judgment is made by comparing a difference between an image forming density at a control level and an image forming density at its adjacent control level with the threshold value described above in the judgment section 66 while performing the scanning of each pixel of an image, a signal that should be generated as the light emission control signal is generated in the first signal generation section 60 or the second signal generation section 62 in accordance with a result of the comparison and judgment.

Figure 13:
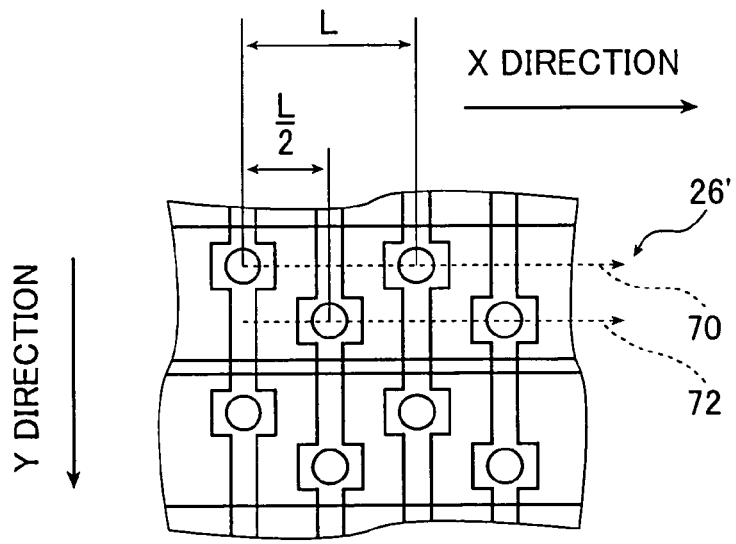
FIG. 13 shows an example of a light emission head having an organic EL element arrangement form that is different from an organic EL element arrangement form shown in FIG. 2B.

The present invention is not limited the organic EL element arrangement form shown in FIG. 2B and it is also possible to use a light emission head 26' having another organic EL element arrangement form shown in FIG. 13.

Like in the case of the light emission head 26, the light emission head 26' is a head where multiple light emission element array lines formed by arranging multiple organic EL elements in a line manner at constant intervals are provided in parallel in a direction orthogonal to the arrangement direction of the organic EL elements. However, the light emission head 26' differs from the light emission head 26 in that the organic EL elements are arranged so that the organic EL elements in each light emission element array line are displaced from those in its adjacent light emission element array line in the main scanning direction (X direction) by one-half of the arrangement intervals. That is, as shown in FIG. 13, the organic EL elements in a light emission element array line 72 are arranged so as to be displaced from the organic EL elements in a light emission element array line 70 in the main scanning direction (X direction) by one-half of the arrangement intervals L (displacement amount=L/2). With this construction, it becomes possible to improve the arrangement density of the organic EL elements. Note that in the light emission head 26', the organic EL elements in each light emission element array line are displaced with respect to the organic EL elements in its adjacent light emission element array line by one-half of the arrangement intervals, although the amount of this displacement is not limited to one-half of the arrangement intervals.

Also, in the light emission head 26', the positions, at which the photosensitive material is exposed, are different between adjacent light emission element array lines, so that in the control signal generation unit 52 described above, the supplied image input signal is subjected to interpolation processing for the displacement of the organic EL elements and the exposure light amount control signal and the ON/OFF control signal $V_2$ are generated using the image input signal after the interpolation processing.

In particular, when an image including letters, lines, or the like as the image contents, whose edge components are clear and aharp, are to be exposed, by performing the interpolation processing on the image input signal for the displacement of the organic EL elements and generating each control signal using the processed image input signal, it becomes possible to further reduce the density of a white background and to increase the density of each portion corresponding to a black letter or the like, which makes it possible to clearly record the edge components. In each portion in which the signal value of the image input signal changes steeply, for instance, there occurs a difference between gradation levels by the density modulation. When this portion is exposed and recorded, it is sufficient that the exposure and recording are performed so that the levels of gradation by the density modulation are interpolated using the displaced organic EL elements.

As to such interpolation processing, it is sufficient that after each portion, such as a portion corresponding to a letter, a line, a symbol, or the like, of an image to be exposed and recorded, in which the interpolation processing should be performed with a higher priority, is identified in advance, the interpolation processing is performed only for the portion and then a control signal for the portion is generated.

Also, in the interpolation processing, linear interpolation (linear approximation interpolation), bi-linear interpolation, nearest neighbour interpolation, or the like is used. The nearest neighbour interpolation is a method with which interpolation is performed to the same signal value as a signal value positioned nearest on an image to be recorded. By applying the nearest neighbour interpolation to the exposure and recording of a letter, line, symbol, or the like described above, it becomes possible to make the edge component clear and sharp.

The interpolation processing method is not specifically limited, although it is preferable that a construction is used in which it is possible to perform switching between various interpolation processing methods in accordance with an image that should be recorded, as described above. For instance, the switching is performed by judging whether an image to be recorded is an image having continuous gradation or an image including letters, lines, symbols, or the like through statistical processing of signal values of an image input signal. Also, a construction may be employed in which after interpolation processing is performed separately using these interpolation processing methods, results of the interpolation processing are averaged and a result of this averageing is set as an image input signal subjected to the interpolation processing. The averaging may be weighted averaging using weighting coefficients or may be a simple addition averaging (the weighting coefficients are the same), for instance.

In the case of the light emission head 26' having such a construction, portions between exposed portions are exposed using the interpolation processing, so that overlapping of exposed portions partially occurs. Therefore, there is apprehension that the resolution of an exposed and recorded image is lowered, although the image resolution is maintained by performing interpolation using the nearest neighbour interpolation processing described above.

Figure 14:
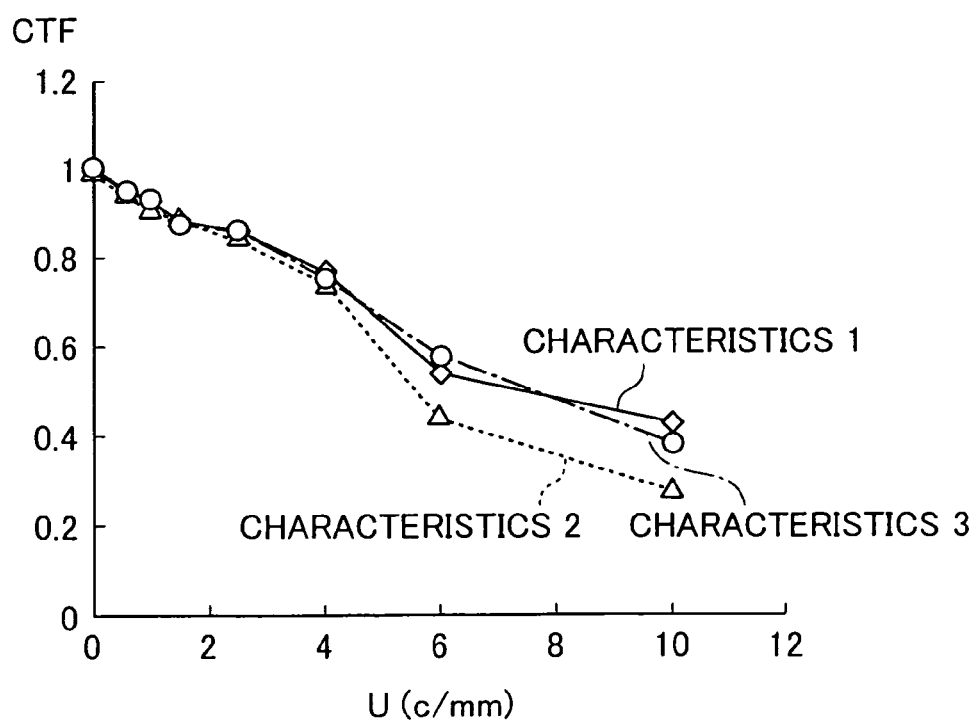
FIG. 14 shows a result of the resolution of an exposed and recorded image using the characteristics of a CTF.

FIG. 14 shows a result of an investigation of the resolutions of images exposed and recorded with various methods using a contrast transfer function (CTF) as a resolution evaluation index. Here, the CTF means a characteristic where multiple rectangular light amount distribution patterns having different spatial frequencies are exposed and recorded, a density profile is obtained by density-measuring the light amount distribution patterns obtained as a result of the exposure and recording using micro-densitometry, a density contrast (maximum density-minimum density) is obtained for each spatial frequency from this density profile, and the density contrast at each spatial frequency is normalized and expressed using the density contrast at the lowest spatial frequency. Therefore, this CTF is an index of the resolution and sharpness of an image.

In FIG. 14, Characteristics 1 represent characteristics in the case where exposure and recording are performed with the exposure and recording method shown in FIG. 3 using the light emission head 26 having the organic EL elements with the arrangement construction shown in FIG. 2B, Characteristics 2 represent characteristics in the case where exposure and recording are performed while performing the linear interpolation processing using the light emission head 26', and Characteristics 3 are characteristics in the case where exposure and recording are performed while performing the nearest neighbour interpolation processing using the exposure head 26'. It can be seen from a comparison of these characteristics that Characteristics 3 based on the nearest neighbour interpolation processing exhibit characteristics that are approximately equal to Characteristics 1 in a low frequency range and a high frequency range. Also, it can be seen that Characteristics 3 are improved in the high frequency range (6 c/mm to 10 c/mm) and the resolution is improved as compared with the case of Characteristics 2 using the linear interpolation processing. Accordingly, in the case of an image where many high-frequency components are contained in an image input signal (in the case of an image including outline letters of a small size (small point number) on a black background, for instance), it becomes possible to suppress the degradation of an image resolution using the nearest neighbour interpolation processing as compared with a case where the linear interpolation processing is used.

The image forming apparatus and the image forming method according to the present invention have been described in detail above, although the present invention is not limited to the embodiments described above and it is of course possible to make various modifications and changes without departing from the gist of the present invention.

What is claimed is:

1. An image forming apparatus that exposes and records an image on a photosensitive material by controlling a light emission amount of each light emission element using an image input signal, comprising:

a plurality of light emission elements that each emit light in accordance with a supplied light emission control signal; and a control signal generation unit that generates the light emission control signal from the image input signal, wherein said control signal generation unit includes:

a first signal generation section that generates a first light amount control signal that controls the light emission amount of each light emission element such that an image is formed on the photosensitive material at a determined density;

a second signal generation section that generates an ON/OFF control signal and a second light amount control signal as a pair of signals, the ON/OFF control signal controlling ON/OFF of exposure by said light emission element and the second light amount control signal controlling the light emission amount of said light emission element at the time of the exposure, such that the photosensitive material, in which the recording should be performed, is exposed by the ON/OFF of the exposure;

a computation section that determines the light emission amount of light that said light emission element should emit from the image input signal using a light amount-density characteristic of the photosensitive material, thereby determining a light emission amount control level of the first light amount control signal; and a signal switching section that generates the light emission control signal by performing signal switching between the first light amount control signal and the pair of the ON/OFF control signal and the second light amount control signal in accordance with a magnitude of a difference between an image forming density obtained on the photosensitive material at the light emission amount control level of the first light amount control signal and an image forming density obtained at a control level adjacent to the determined control level.

2. The image forming apparatus according to claim 1, wherein exposure patterns to be exposed on the photosensitive material by the ON/OFF of the exposure are determined, the patterns having different sizes, and said second signal generation section generates the ON/OFF control signal and the second light amount control signal corresponding to each exposure pattern, and said signal switching section generates the light emission control signal by performing switching of a signal for controlling said light emission element to the ON/OFF control signal and the second light amount control signal corresponding to one exposure pattern selected from among the exposure patterns such that a difference between an image forming density at a light emission amount control level determined from the image input signal and an image forming density at a control level adjacent to the image forming density becomes equal to or less than a predetermined value.

3. The image forming apparatus according to claim 1, wherein said control signal generation unit generates the ON/OFF control signal from the image input signal to which a first noise component has been added.

4. The image forming apparatus according to claim 1, wherein said control signal generation unit further includes a judgment section that makes a judgment by comparing a difference in image forming density between adjacent control levels with an addition value obtained by adding a second noise component to a predetermined certain value, and said switching section generates the light emission control signal by performing the signal switching in accordance with a result of the judgment.

5. The image forming apparatus according to claim 1, wherein said control signal generation unit generates, as the second light amount control signal, a pulse that causes the light emission by said light emission element to be started and causes the light emission by said light emission element to be ended within a rising response stage at the time of the light emission, and the light emission amount of said light emission element is controlled in accordance with the pulse.

6. The image forming apparatus according to claim 5, wherein said control signal generation unit generates a short pulse whose pulse width is equal to or shorter than a time constant of rising at the time of the light emission possessed by said light emission element.

7. The image forming apparatus according to claim 5, wherein said control signal generation unit generates at least two short pulses having different pulse widths as the second light amount control signal, and said light emission element performs the exposure and recording by emitting light a plurality of times with respect to a same image position using the at least two short pulses of the second light amount control signal.

8. The image forming apparatus according to claim 5, wherein said light emission element is controlled in light emission intensity through control of a pulse width of the short pulse.

9. The image forming apparatus according to claim 6, wherein when the difference between the image forming density obtained on the photosensitive material at the determined light emission amount control level and the image forming density obtained at the control level adjacent to the determined control level is equal to or more than a predetermined value, said control signal generation unit generates a plurality of short pulses and sets the plurality of short pulses as the second light amount control signal.

10. The image forming apparatus according to claim 1, wherein said light emission element is an electroluminescence element.

11. The image forming apparatus according to claim 10, wherein a plurality of light emission element arrays are formed by arranging a plurality of electroluminescence elements in a line manner and a light emission head is formed by arranging said plurality of light emission element arrays in parallel in a direction orthogonal to an arrangement direction of said electroluminescence elements, the image forming apparatus further comprises a moving unit that moves the photosensitive material, on which the image is to be recorded, in a direction orthogonal to the arrangement direction relative to said light emission head, and in order to record the image through density modulation and area modulation in a predetermined pattern of dots, said light emission head records the image by exposing, using the second light amount control signal and the ON/OFF control signal, the moving photosensitive material in the arrangement direction in a line manner while overlay-exposing a portion of the photosensitive material exposed by an electroluminescence element using other electroluminescence element.

12. The image forming apparatus according to claim 11, wherein said control signal generation unit generates the second light amount control signal using higher-order bits of the image input signal and generates the ON/OFF control signal using lower-order bits thereof such that intervals between adjacent levels of gradation by the density modulation are sub-divided by levels of gradation by the area modulation in the image recorded on the photosensitive material.

13. The image forming apparatus according to claim 11, wherein as the pattern, a plurality of patterns different in size of dots that should be recorded by said electroluminescence element are determined for one level of gradation by the area modulation, and said control signal generation unit generates the ON/OFF control signal while performing switching between the plurality of patterns.

14. The image forming method according to claim 11, wherein in said plurality of light emission element arrays, said electroluminescence elements are arranged at predetermined intervals, and said light emission head includes at least one light emission element array where said electroluminescence elements are arranged so as to be displaced from said organic electroluminescence elements in at least one other light emission element array in the arrangement direction.

15. The image forming apparatus according to claim 14, wherein said control signal generation unit performs interpolation processing on the image input signal in accordance with an electroluminescence element displacement amount and generates a light emission control signal that controls light emission in said at least one light emission element array, in which said electroluminescence elements are arranged so as to be displaced, from the image input signal subjected to the interpolation processing.

16. The image forming apparatus according to claim 15, wherein said control signal generation unit performs a plurality of kinds of interpolation processing with respect to the image input signal and generates the light emission control signal to be supplied to said at least one light emission element array, in which said electroluminescence elements are arranged so as to be displaced, while performing switching between the plurality of kinds of interpolation processing in accordance with which portion of the image is to be recorded.

17. The image forming apparatus according to claim 15, wherein said control signal generation unit performs a plurality of kinds of interpolation processing with respect to the image input signal and generates the light emission control signal to be supplied to said light emission element array, in which said electroluminescence elements are arranged so as to be displaced, while performing averaging processing on interpolation processing results.

18. An image forming method of exposing and recording an image on a photosensitive material by controlling a light emission amount of each light emission element using an image input signal, comprising:

a first signal generation step of generating from the image input signal a first light amount control signal that controls the light emission amount of each light emission element such that an image is formed on the photosensitive material at a determined density;

a second signal generation step of generating from the image input signal an ON/OFF control signal that controls ON/OFF of exposure by said light emission element and a second light amount control signal that controls the light emission amount by said light emission element for the exposure as a pair of signals such that each part of the photosensitive material, in which the recording should be performed, is exposed by the ON/OFF of the exposure; and a control signal generating step of determining the light emission amount of light that said light emission element should emit from the image input signal using a light amount-density characteristic of the photosensitive material, and generating the light emission control signal by performing signal switching between the first light amount control signal generated in the first signal generation step and the pair of the ON/OFF control signal and the second light amount control signal generated in the second signal generation step in accordance with a magnitude of a difference between an image forming density obtained on the photosensitive material at a light emission amount control level of the first light amount control signal determined by the light emission amount and an image forming density obtained at a control level adjacent to the light emission amount control level.

* * * * *